United States Patent Office 3,772,441
Patented Nov. 13, 1973

3,772,441
ANTI-INFLAMMATORY IMIDAZOLES
Joseph George Lombardino, Niantic, Conn., assignor to Pfizer Inc., New York, N.Y.
No Drawing. Original application Nov. 16, 1970, Ser. No. 90,077, now Patent No. 3,707,475, dated Dec. 26, 1972. Divided and this application May 8, 1972, Ser. No. 251,522
Int. Cl. A61k 27/00
U.S. Cl. 424—273     21 Claims

ABSTRACT OF THE DISCLOSURE 2,4- and 4,5 - diarylimidazoles and acid addition salts thereof, a novel class of anti-inflammatory agents.

CROSS REFERENCE TO RELATED APPLICATION

This application is a division of application Ser. No. 90,077, filed Nov. 16, 1970, now U.S. Pat. 3,707,475.

BACKGROUND OF THE INVENTION

This invention relates to polyarylimidazoles, and more particularly to a series of 2,4 - diaryl-5-substituted-, 4,5-diaryl-2-substituted-imidazoles and their alkylation products and the acid addition salts thereof, possessing chemotherapeutic activity and to the method of inhibiting inflammation in mammals with said agents.

Aryl substituted imidazoles have been known in the chemical literature for some time and have been reported to possess varied properties. 2,4,5-triarylimidazoles claimed as antifertility agents have been synthesized by Bhaduri, et al., Indian J. Chem., 4, 419 (1966); sedative properties are reported by Lespagnol et al., Chem. Therap., 1, 292 (1966), and antitubercular activity by Deliwala et al., Proc. Ind. Acad. Sci., 31, 107 (1950) for a series of 2,4,5-triarylimidazoles. No utility as anti-inflammatory agents has been disclosed.

The use of polyarylimidazoles as phototropic agents possessing chemiluminescent characteristics has appeared extensively in the literature. Cook et al., J. Chem. Soc., 278 (1941), reports the synthesis of a number of 2-substituted-4,5-diphenylimidazoles, wherein the 2 substituent is alkyl or aryl, which have chemiluminescent properties, and 2,4,5-triarylimidazoles are claimed in French Pat. 1,351,818, Belgian Pat. 585,555 and German Pat. 1,106,599 to possess phototropic, electrophotographic and xerographic utility, respectively.

White et al., J. Org. Chem., 29, 1926 (1964) reported the synthesis of a series of 2-substituted-phenyl-4,5-diphenylimidazoles, using the procedure of Davidson et al., J. Org. Chem., 2, 319 (1937), in an effort to study the infrared characteristics of this class of compounds. More recently, Ogata et al., J. Org. Chem., 34, 3981 (1969), during a kinetic study, synthesized a number of nuclear substituted 2,4,5-triphenylimidazoles. No utility was disclosed during either study.

SUMMARY OF THE INVENTION

The anti-inflammatory agents of this invention are represented by the formulae:

$$\text{(I)} \quad \text{(II)} \quad \text{(III)}$$

and the acid addition salts thereof, where:

Ar and A′ are each selected from the group consisting of furyl, thienyl, pyridyl, phenyl and substituted phenyl where said substituent is fluorine, chlorine, bromine, alkyl, alkoxy or alkylthio each containing from 1 to 4 carbon atoms or 3,4-dimethoxy;
$R_1$ is hydrogen, alkyl containing from 1 to 4 carbon atoms or alkenyl containing from 3 to 4 carbon atoms; and
$R_2$ is selected from the group consisting of trifluoromethyl, alkyl containing from 1 to 4 carbon atoms, furyl, thienyl, pyridyl, phenyl and substituted phenyl where said substituent is fluorine, chlorine, bromine, trifluoromethyl, alkyl, alkoxy or alkylthio each containing from 1 to 4 carbon atoms, 3,4-dimethoxy or 2,4-dichloro.

Of particular interest, because of their usefulness as anti-inflammatory agents, are congeners of Formula I wherein Ar and Ar′ are each phenyl or substituted phenyl wherein said substituent is fluorine, chlorine, bromine, alkyl, alkoxy or alkylthio each containing from 1 to 4 carbon atoms; $R_1$ is hydrogen or alkyl containing 1 to 4 carbon atoms; and $R_2$ is trifluoromethyl. Also of interest are those anti-inflammatory agents of Formulae II and III wherein Ar, Ar′ and $R_2$ are each phenyl and substituted phenyl where said substituent is fluorine, chlorine, bromine, alkyl, alkoxy or alkylthio each containing from 1 to 4 carbon atoms and $R_1$ is hydrogen. Also, compounds of the present invention, surprisingly, have shown excellent activity as inhibitors of platelet aggregation.

Also considered within the scope of this invention are compounds of the formulae:

$$\text{(IV)} \quad \text{and} \quad \text{(V)}$$

and the alkylation products thereof, wherein Ar and Ar′ are as previously indicated and $R_3$ and $R_4$ when considered separately are lower alkyl or trifluoromethyl and $R_3$ and $R_4$ when taken together with the carbon atom to which they are attached form a ring containing from 6 to 8 carbon atoms which can be interrupted by the hetero atom S, O or NH.

DETAILED DESCRIPTION OF THE INVENTION

In accordance with the process employed for preparing the polyarylimidazoles of the present invention of the Formulae I, II and III:

$$\text{(I)} \quad \text{(II)}$$

and $$\text{(III)}$$

wherein Ar, Ar′ and $R_2$ are as previously defined and $R_1$ is hydrogen, the following scheme is illustrative:

$$\text{Ar}-\underset{\text{O}}{\overset{\text{}}{\text{C}}}-\underset{\text{O}}{\overset{\text{}}{\text{C}}}-\text{Ar}' + R_2\text{CHO} + \text{CH}_3\text{CO}_2\text{NH}_4 \longrightarrow \text{I}$$

and $$\text{Ar}-\underset{\text{O}}{\overset{\text{}}{\text{C}}}-\underset{\text{O}}{\overset{\text{}}{\text{C}}}-R_2 + \text{Ar}'\text{CHO} + \text{CH}_3\text{CO}_2\text{NH}_4 \longrightarrow \text{II and III}$$

Both the above illustrated reactions are conducted under similar reaction conditions, which are essentially those as employed by Davidson et al., J. Org. Chem., 2, 319 (1937), and comprise heating a mixture of an α-diketone, an aldehyde or derivative thereof and ammonium acetate in a solvent of glacial acetic acid. As much as a five to ten-fold excess of ammonium acetate can be employed. The amount of aldehyde used in relation to the diketone can vary from an equimolar amount to as much as a 100% excess.

In general, reflux temperatures are considered desirable although lower temperatures with correspondingly longer reaction periods are operable. When said reflux temperatures are employed reaction times of 1–5 hours are adequate to yield the desired product.

A convenient method for isolation of the product comprises dilution of the reaction mixture with water followed by neutralization with ammonium hydroxide to a pH of approximately 7. The resulting precipitate is then filtered, dried and recrystallized from an appropriate solvent.

The requisite α-diketones of the type

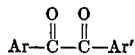

are either commercially available, or can easily be synthesized either by oxidation of the corresponding α-hydroxyketone according to the method as taught by Clarke et al., "Organic Syntheses," coll. vol. I, John Wiley & Sons, Inc., New York, N.Y., 1942, p. 87, or by a selenium dioxide oxidation of the monoketone as taught by Hatt et al., J. Chem. Soc., 93 (1936). The α-hydroxyketones, in turn, are commercial reagents or are prepared by the methods as outlined by Ide et al., "Organic Reactions," vol. IV, John Wiley & Sons, Inc., New York, N.Y., 1948, p. 269, while the monoketones are commercial reagents or are synthesized according to the methods outlined by Gore, "Friedel-Crafts and Related Reactions," vol. III, Interscience Publishers, New York, N.Y., 1964, chapter 31.

α-Diketones of the type

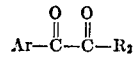

wherein $R_2$ is lower alkyl and trifluoromethyl, are similarly synthesized by oxidation of the corresponding acyloins of the formula

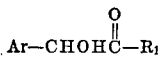

or by the aforementioned selenium dioxide method. Acyloin intermediates leading to the products of the instant invention are prepared by the methods outlined by McElvain, "Organic Reactions," vol. IV, John Wiley & Sons, Inc., New York, N.Y., 1948, p. 256, while the monoketone precursor can be prepared as taught by Nes et al., J. Am. Chem. Soc., 72, 5409 (1950).

The requisite aldehydes are industrial chemicals or prepared by the methods as taught by Carnduff, Quart. Rev. 20, 169 (1966).

A second, and equally useful, alternate route to the products of the present invention comprises condensation of an amidine with an α-haloketone as illustrated.

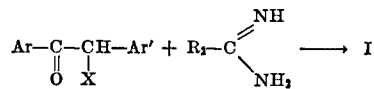

and

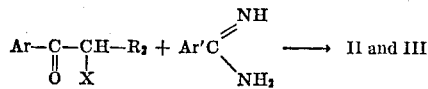

wherein Ar, Ar' and $R_2$ are as previously described and X is chlorine or bromine and $R_1$ is hydrogen.

The alternate synthetic method is essentially that as taught by Krieg et al., Chem. Ber., 100, 4042 (1967) and comprises treating an aqueous solution of an appropriate amidine hydrohalide, preferably hydrochloride, with an equimolar amount of the requisite α-haloketone dissolved in a water immiscible solvent, such as chloroform, methylene chloride or carbon tetrachloride, followed by the addition of two moles of an alkali metal hydroxide. In general, reflux temperatures are favored, although lower temperatures with corresponding longer reaction times are operable. Reaction times vary with the concentration, temperature and reactivity of the respective reactants, and are generally from 15 minutes to 4 hours.

The product is conveniently isolated by separation of the nonaqueous phase and evaporation to dryness. The residual solid product can be purified by column chromatography or by simple recrystallization depending on the degree of purity of the crude.

The requisite α-haloketones necessary for the above described alternate synthesis are commercial agents or can be made from the corresponding ketone via bromination according to the methods outlined by Wagner et al., "Synthetic Organic Chemistry," John Wiley & Sons, Inc., New York, N.Y., 1958, p. 100. The appropriate ketones are prepared by the methods outlined by Gore, "Friedel-Crafts and Related Reactions," vol. III, Interscience Publishers, New York, N.Y., 1964, chapter 31.

The amidines employed in the alternate route to the products of the present invention are synthesized by the methods as outlined by Wagner et al., "Synthetic Organic Chemistry," John Wiley & Sons, Inc., New York. N.Y., 1958, p. 634.

A characteristic of the compounds of the present invention of the Formulae I, II and III wherein $R_1$ is hydrogen is the acidic nature of said hydrogen and the property to form salts with basic reagents such as alkali metal hydroxides, alkoxides or hydrides and alkali earth metal hydroxides.

It is these above described basic salts which can be alkylated giving rise to compounds related to I, II and III where $R_1$ is alkyl and alkenyl. Said salts can be formed in situ or can be preformed and isolated prior to their alkylation.

In practice, a solution of the unalkylated imidazole in a highly polar, aprotic solvent such as dimethylformamide, dimethylsulfoxide, or hexamethylphosphoramide is treated with at least an equivalent amount of an alkali metal alkoxide or hydride such as sodium methoxide or sodium hydride, thus forming the corresponding sodium salt in situ. The alkyl or alkenyl halide, either chloride, bromide or iodide, is added, usually in an aprotic solvent, to the solution or suspension of the requisite salt of the imidazole. At least an equimolar amount of alkylating agent is added, plus as much as a 10–50% excess.

Reaction temperatures are not critical, but for convenience the reaction mixture is heated at steam bath temperatures for 1–5 hours. Following the completion of the reaction, the product is isolated by dilution of the reaction mixture with water and filtration. Alternately, the product can be extracted from the diluted reaction using water immiscible solvents such as benzene or chloroform.

The isolated products can be further purified by recrystallization from a suitable solvent.

The imidazoles of Formulae II and III where $R_1$ is hydrogen are equivalent because of the tautomeric nature of the acidic hydrogen as illustrated:

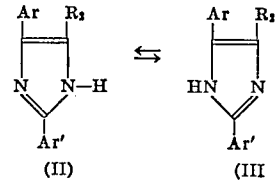

However, once alkylation has been carried out on the imidazole, tautomerization through migration of the alkyl group is impossible. A more detailed discussion of this concept is provided by Schipper et al., "Heterocyclic Compounds," vol. V, R. C. Elderfield, ed., John Wiley & Sons, Inc., New York, N.Y. (1957), chapter 4, p. 198.

Thus, during alkylation of the imidazoles it can be noted that two positional isomers are frequently formed due to the difference in the nature of the Ar and $R_2$ substituents.

In the case of such experimental results, the mixture of isomers is recovered by methods known to those skilled in the art. In many of the preparations disclosed wherein a solid, often crystalline material, separates from the reaction mixture, the solid appears to consist predominantly of one of the isomers. Said isomer can be purified by repeated recrystallization from a suitable solvent to a constant melting point. The other isomer, the one present in smaller amounts in the originally isolated solid material, is the predominant product in the mother liquor. It can be recovered therefrom by methods known to those skilled in the art, as for example, the evaporation of the mother liquor and repeated crystallization of the residue to a product of constant melting point. Alternatively, the reaction mixture can be extracted either before or after evaporation to dryness.

Although said mixtures may be separated by methods known to those skilled in the art, for practical reasons it is advantageous to use said mixtures as they are isolated from the reaction. Further, it is frequently advantageous to purify these mixtures of isomers by at least one recrystallization from an appropriate solvent or by trituration in an appropriate solvent. Said recrystallization or trituration thus allows the separation of the mixture of positional isomers from such extraneous materials as starting material and undesirable by-products.

The identification of the isomers has not been completed. Both isomers of a given compound, however, exhibit the same type of activity, e.g., as anti-inflammatory agents.

As has been previously mentioned, the compounds of the present invention wherein $R_1$ is hydrogen can form salts with basic reagents. In addition to this characteristic, imidazoles wherein $R_1$ is hydrogen, alkyl or alkenyl can also, as previously mentioned, form acid addition salts. Said basic compounds of the present invention are converted to the acid addition salts by interaction of the base with an acid either in an aqueous or nonaqueous medium. In a similar manner, treatment of the acid addition salts with an equivalent amount of an aqueous base solution, e.g., alkali metal hydroxides, alkali metal carbonates and alkali metal bicarbonates or with an equivalent amount of a metal cation which forms an insoluble precipitate with the acid anion, results in a regeneration of the free base form. Such conversions are best carried out as rapidly as possible and under temperature conditions and method dictated by the stability of said basic products. The bases thus regenerated may be reconverted to the same or a different acid addition salt.

In the utilization of the chemotherapeutic activity of those compounds of the present invention which form salts, it is preferred, of course, to use pharmaceutically acceptable salts. Although water-insolubility, high toxicity, or lack of crystalline nature may make some particular salt species unsuitable or less desirable for use as such in a given pharmaceutical application, the water insoluble or toxic salts can be converted to the corresponding pharmaceutically acceptable bases by decomposition of the salt as described above, or alternately they can be converted to any desired pharmaceutically acceptable acid addition salt.

Examples of acids which provide pharmaceutically acceptable anions are hydrochloric, hydrobromic, hydroiodic, nitric, sulfuric, or sulfurous, phosphoric, acetic, lactic, citric, tartaric, succinic, maleic, and gluconic acids.

As previously indicated, the polyarylimidazoles of the present invention are all readily adapted to therapeutic use as anti-inflammatory agents in mammals. Outstanding for their effectiveness in this regard include the following agents:

2-trifluoromethyl-4,5-bis(p-methoxyphenyl)imidazole,
2-trifluoromethyl-4,5-bis(p-methylthiophenyl)imidazole,
2-trifluoromethyl-4,5-bis(p-n-butoxyphenyl)imidazole,
2-trifluoromethyl-4,5-bis(3,4-dimethoxyphenyl)imidazole,
2-trifluoromethyl-4,5-bis(p-ethoxyphenyl)imidazole,
2-trifluoromethyl-4,5-bis(p-bromophenyl)imidazole,
2-trifluoromethyl-4,5-bis(o-methoxyphenyl)imidazole,
2-trifluoromethyl-4,5-bis(m-methoxyphenyl)imidazole,
2-trifluoromethyl-4,5-bis(p-fluorophenyl)imidazole,
2-trifluoromethyl-4,5-bis(p-tolyl)imidazole,
2-trifluoromethyl-4-phenyl-5-(p-bromophenyl)imidazole,
2-trifluoromethyl-4-phenyl-5-(p-methoxyphenyl) imidazole,
1-methyl-2-trifluoromethyl-4,5-bis(p-methoxyphenyl) imidazole and
2-(p-bromophenyl)-4,5-diphenylimidazole.

A standard procedure for detecting and comparing anti-inflammatory activity of compounds in this series and for which there is an excellent correlation with human efficacy is the carrageenin rat foot adena test, of Winter et al., Proc. Soc. Exp. Biol., 111, 544 (1962), whereby unanesthetized adult male albino rats of 150–190 g. body weight are each numbered, weighed and marked with ink on the right lateral malleolus. One hour after administration of the drug by gavage, edema is induced by injection of 0.05 ml. of 1% solution of carrageenin into the plantar tissue of the marked paws. Immediately thereafter, the volume of the injected paw is measured. The increase in volume three hours after the injection of carrageenin constitutes the individual response. Compounds are considered active if the difference in response between a control and the drug being tested is significant. Standard compounds are phenylbutazone at 33 mg./kg. and acetylsalicylic acid at 100 mg./kg., both with oral administration.

The polyarylimidazoles and the pharmaceutically acceptable salts thereof, which are useful anti-inflammatory agents, may be administered either as individual therapeutic agents or as mixtures of therapeutic agents. They may be administered alone, but are generally administered with a pharmaceutical carrier selected on the basis of the chosen route of administration and standard pharmaceutical practice. For example, they may be administered orally in the form of tablets or capsules containing such excipients as starch, milk, sugar or certain types of clay, etc. They may be administered orally in the form of elixirs or oral suspensions with the active ingredients combined with emulsifying and/or suspending agents. They may be injected parenterally, and for this use they, or appropriate derivatives, may be prepared in the form of sterile aqueous solutions. Such aqueous solutions should be suitably buffered, if necessary, and should contain other solutes such as saline or glucose to render them isotonic.

Although the use of the present invention is directed toward the treatment of mammals in general, the preferred subject is humans. In determining an efficacious dose for human therapy, results of animal testing are frequently extrapolated and a correlation is assumed between animal test behavior and proposed human dosage. When a commercially employed standard is available, the dose level of the clinical candidate in humans is frequently determined by comparison of its performance with the standard in an animal test. For example, phenylbutazone is employed as a standard anti-inflammatory agent and is administered to humans at the rate of 100 to 400 mg. daily. It is assumed, then, that if compounds of the present invention have activity comparable to phenylbutazone in the test assay, that similar doses will provide comparable responses in humans.

Obviously, the physician will ultimately determine the dosage which will be most suitable for a particular individual, and it will vary with the age, weight and response of the particular patient as well as with the nature and extent of the symptoms and the pharmacodynamic characteristics of the particular agent to be administered. Generally, small doses will be administered initially, with a gradual increase in the dosage until the optimum level is determined. It will often be found that when the composition is administered orally, larger quantities of the active ingredient will be required to produce the same level as produced by a small quantity administered parenterally.

Having full regard for the foregoing factors it is considered that an effective daily dosage of the compounds of the present invention in humans of approximately 10–500 mg. per day, with a preferred range of about 10 to 200 mg. per day in single or divided doses, or at about 0.1 to 3.0 mg./kg. of body weight will effectively alleviate inflammation in human subjects prone to said disorder. These values are illustrative, and there may, of course, be individual cases where higher or lower dose ranges are merited.

The following examples are provided solely for the purpose of illustration and are not to be construed as limitations of this invention, many variations of which are possible without departing from the spirit or scope thereof.

EXAMPLE I 2-trifluoromethyl-4,5-bis(p-methoxyphenyl)imidazole

To 500 ml. of glacial acetic acid containing 20 g. (0.07 mole) of 4,4′-dimethoxybenzil and 40 g. of ammonium acetate, and heated to 100° C., is added dropwise over a 50 minute period 11 g. (0.07 mole) of trifluoroacetaldehyde ethyl-hemiacetal. The resulting reaction mixture is heated to reflux for 2 hours, followed by the addition of an additional 11 g. of the hemiacetal and continued heating overnight. The solution is cooled and added with stirring to 1 l. of water. The pH is adjusted to 6.8 with ammonium hydroxide and the crude product filtered and chromatographed on 650 g. of silica gel using a benzene-ethyl acetate-acetic acid system. The fractions are combined and concentrated to dryness in vacuo, 12.0 g., M.P. 192–194° C.

*Analysis.*—Calcd. for $C_{18}H_{15}F_3N_2O_2$ (percent): C, 62.1; H, 4.3; N, 8.0. Found (percent): C, 62.3; H, 4.4; N, 8.1.

EXAMPLE II

Starting with the appropriate diaryldiketone and trifluoroacetaldehyde ethyl hemiacetal, and repeating the procedure of Example I, the following 2-trifluoromethyl imidazoles are prepared:

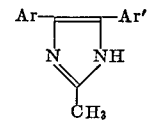

| Ar | Ar′ | M.P., ° C. |
|---|---|---|
| $C_6H_5$ | $C_6H_5$ | 225–227 |
| 2-pyridyl | 2-pyridyl | 226–229 |
| $C_6H_5$ | 4-$BrC_6H_4$ | 235–238 |
| 3-$CH_3OC_6H_4$ | 3-$CH_3OC_6H_4$ | 145–147 |
| $C_6H_5$ | 4-$CH_3OC_6H_4$ | 201–205 |
| 4-$BrC_6H_4$ | 4-$BrC_6H_4$ | 271–273 |
| 2-$CH_3OC_6H_4$ | 2-$CH_3OC_6H_4$ | 211 dec. |
| 2-$CH_3C_6H_4$ | 2-$CH_3C_6H_4$ | 212–214 |
| 4-$CH_3SC_6H_4$ | 4-$CH_3SC_6H_4$ | 158 dec. |
| 4-$CH_3C_6H_4$ | 4-$CH_3C_6H_4$ | 242–243 |
| 4-n-$C_4H_9OC_6H_4$ | 4-n-$C_4H_9OC_6H_4$ | 168–173 |
| 4-$C_2H_5OC_6H_4$ | 4-$C_2H_5OC_6H_4$ | 154–157 |
| 4-$FC_6H_4$ | 4-$FC_6H_4$ | 137–141 |
| 3,4-$(CH_3O)_2C_6H_3$ | 3,4-$(CH_3O)_2C_6H_3$ | 190–192 |

EXAMPLE III

Employing the procedure of Example I, and starting with the requisite reagents, the following imidazoles are prepared:

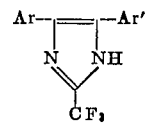

| Ar | Ar′ | Ar | Ar′ |
|---|---|---|---|
| 2-$FC_6H_4$ | $C_6H_5$ | 4-$BrC_6H_4$ | 4-$CH_3C_6H_4$ |
| 2-$FC_6H_4$ | 2-$ClC_6H_4$ | 4-$BrC_6H_4$ | 2-furyl |
| 2-$FC_6H_4$ | 4-$ClC_6H_4$ | 2-furyl | 2-furyl |
| 2-$FC_6H_4$ | 3-$BrC_6H_4$ | 4-$BrC_6H_4$ | 2-$CH_3C_6H_4$ |
| 2-$FC_6H_4$ | 4-$FC_6H_4$ | 2-$BrC_6H_4$ | 4-$BrC_6H_4$ |
| 4-$FC_6H_4$ | 3-$FC_6H_4$ | 4-$BrC_6H_4$ | 4-$ClC_6H_4$ |
| 4-$FC_6H_4$ | 2-thienyl | 2-$CH_3OC_6H_4$ | 3-$CH_3OC_6H_4$ |
| 4-$FC_6H_4$ | 2-$CH_3C_6H_4$ | 2-$CH_3OC_6H_4$ | $C_6H_5$ |
| 4-$FC_6H_4$ | 4-$C_2H_5C_6H_4$ | 2-$CH_3OC_6H_4$ | 2-$CH_3SC_6H_4$ |
| 4-$FC_6H_4$ | 4-$CH_3OC_6H_4$ | 2-$CH_3OC_6H_4$ | 4-$CH_3SC_6H_4$ |
| 4-$FC_6H_4$ | 4-i-$C_3H_7C_6H_4$ | 2-$CH_3OC_6H_4$ | 4-n-$C_4H_9SC_6H_4$ |
| 4-$ClC_6H_4$ | 2-$CH_3C_6H_4$ | 2-thienyl | 2-thienyl |
| 4-$ClC_6H_4$ | 4-$CH_3SC_6H_4$ | 2-thienyl | 4-$CH_3OC_6H_4$ |
| 4-$ClC_6H_4$ | 3-$CH_3C_6H_4$ | 2-thienyl | 4-$BrC_6H_4$ |
| 4-$ClC_6H_4$ | 4-n-$C_4H_9C_6H_4$ | 3-thienyl | 4-n-$C_4H_9OC_6H_4$ |
| 4-$ClC_6H_4$ | 4-n-$C_2H_5OC_6H_4$ | 3-thienyl | 2-furyl |
| 4-$ClC_6H_4$ | $C_6H_5$ | 3-thienyl | 2-pyridyl |
| 4-$ClC_6H_4$ | 2-$ClC_6H_4$ | 2-pyridyl | 4-pyridyl |
| 4-$ClC_6H_4$ | 4-$ClC_6H_4$ | 2-pyridyl | 4-$CH_3C_6H_4$ |
| 3-$ClC_6H_4$ | 3-$ClC_6H_4$ | 2-pyridyl | 4-$BrC_6H_4$ |
| 3-$ClC_6H_4$ | 4-$C_2H_5C_6H_4$ | 2-pyridyl | 2-$CH_3SC_6H_4$ |
| 3-$ClC_6H_4$ | 4-n-$C_4H_9OC_6H_4$ | 2-pyridyl | 2-$ClC_6H_4$ |
| 3-$ClC_6H_4$ | 4-t-$C_4H_9C_6H_4$ | 3-furyl | 3-$CH_3OC_6H_4$ |
| 3-$ClC_6H_4$ | 4-i-$C_3H_7OC_6H_4$ | 3-furyl | 4-$ClC_6H_4$ |
| 3-$ClC_6H_4$ | 4-$C_2H_5SC_6H_4$ | 3-furyl | 4-pyridyl |
| 2-$CH_3C_6H_4$ | $C_6H_5$ | 4-$ClC_6H_4$ | 3,4-$(CH_3O)_2C_6H_3$ |
| 2-$CH_3C_6H_4$ | 4-$CH_3OC_6H_4$ | 4-$CH_3OC_6H_4$ | 3,4-$(CH_3O)_2C_6H_3$ |
| 2-$CH_3C_6H_4$ | 3-$C_2H_5OC_6H_4$ | 4-$C_2H_5SC_6H_4$ | 3,4-$(CH_3O)_2C_6H_3$ |
| 3-$CH_3C_6H_4$ | 4-$CH_3C_6H_4$ | 4-$BrC_6H_4$ | 3,4-$(CH_3O)_2C_6H_3$ |
| 3-$CH_3C_6H_4$ | 3-pyridyl | 2-thienyl | 3,4-$(CH_3O)_2C_6H_3$ |
| 3-$CH_3C_6H_4$ | 4-pyridyl | 3-furyl | 3,4-$(CH_3O)_2C_6H_3$ |
| 4-n-$C_3H_7C_6H_4$ | 4-pyridyl | 4-pyridyl | 3,4-$(CH_3O)_2C_6H_3$ |
| 4-n-$C_3H_7C_6H_4$ | 2-thienyl | | |
| 4-n-$C_3H_7C_6H_4$ | 3-furyl | | |
| 4-n-$C_3H_7C_6H_4$ | 4-s-$C_4H_9OC_6H_4$ | | |

EXAMPLE IV

2-(p-bromophenyl)4,5-diphenylimidazole

A mixture of 4.2 g. (0.02 mole) of benzil, 4.35 g. (0.023 mole) of p-bromobenzaldehyde and 1.2 g. (0.156 mole) of ammonium acetate in 75 ml. of acetic acid is heated to reflux for 2-3 hours. The resulting solution is cooled, neutralized with ammonium hydroxide and diluted with 200 ml. of water. The white, solid product is filtered and dried, 6.99 g., M.P. 261.5–263.5° C.

*Analysis.*—Calcd. for $C_{21}H_{15}BrN_4$ (percent): C, 67.1; H, 4.0; N, 7.4. Found (percent): C, 67.2; H, 4.1; N, 7.2.

EXAMPLE V

Starting with the appropriate diketone and requisite aldehyde, and following the procedure of Example IV, the following analogs are synthesized:

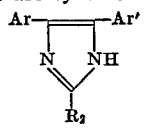

| Ar | Ar' | $R_2$ | M.P., ° C. |
|---|---|---|---|
| $C_6H_5$ | $C_6H_5$ | $C_6H_5$ | 192–195 |
| $C_6H_5$ | $C_6H_5$ | $4\text{-}CH_3OC_6H_4$ | 230–232 |
| $4\text{-}CH_3OC_6H_4$ | $4\text{-}CH_3OC_6H_4$ | $2\text{-}CH_3OC_6H_4$ | 215–218 |
| $4\text{-}CH_3OC_6H_4$ | $4\text{-}CH_3OC_6H_4$ | $4\text{-}CH_3OC_6H_4$ | 183–185 |
| $4\text{-}CH_3OC_6H_4$ | $4\text{-}CH_3OC_6H_4$ | $3,4\text{-}(CH_3O)_2C_6H_4$ | 122 dec. |
| $3\text{-}CH_3OC_6H_4$ | $3\text{-}CH_3OC_6H_4$ | $4\text{-}CH_3OC_6H_4$ | 164–166 |
| $C_6H_5$ | $4\text{-}CH_3OC_6H_4$ | $4\text{-}CH_3OC_6H_4$ | 112 dec. |
| $2\text{-}CH_3OC_6H_4$ | $2\text{-}CH_3OC_6H_4$ | $4\text{-}CH_3OC_6H_4$ | 254 dec. |
| $4\text{-}n\text{-}C_4H_9OC_6H_4$ | $4\text{-}n\text{-}C_4H_9OC_6H_4$ | $4\text{-}CH_3OC_6H_4$ | 130 dec. |
| $3\text{-}CH_3OC_6H_4$ | $3\text{-}CH_3OC_6H_4$ | $C_6H_5$ | 189–191 |
| $4\text{-}CH_3OC_6H_4$ | $4\text{-}CH_3OC_6H_4$ | $C_6H_5$ | 201.5–203 |
| $4\text{-}BrC_6H_4$ | $C_6H_5$ | $4\text{-}CH_3OC_6H_4$ | 261–262 |
| $4\text{-}BrC_6H_4$ | $4\text{-}BrC_6H_4$ | $4\text{-}CH_3OC_6H_4$ | 279–280 |
| $2\text{-}CH_3OC_6H_4$ | $2\text{-}CH_3OC_6H_4$ | $4\text{-}BrC_6H_4$ | 203–208 |
| $4\text{-}CH_3OC_6H_4$ | $C_6H_5$ | $4\text{-}BrC_6H_4$ | 236–242 |
| $C_6H_5$ | $C_6H_5$ | $3,4\text{-}(CH_3O)_2C_6H_3$ | 215–219 |
| $C_6H_5$ | $C_6H_5$ | $2\text{-}CH_3OC_6H_4$ | 205–207 |
| $4\text{-}CH_3OC_6H_4$ | $4\text{-}CH_3OC_6H_4$ | $4\text{-}BrC_6H_4$ | 162 dec. |
| $3\text{-}CH_3C_6H_4$ | $3\text{-}CH_3OC_6H_4$ | $4\text{-}BrC_6H_4$ | 207–209 |
| $C_6H_5$ | $4\text{-}CH_3OC_6H_4$ | $C_6H_5$ | 224–226 |
| $2\text{-}CH_3OC_6H_4$ | $2\text{-}CH_3OC_6H_4$ | $C_6H_5$ | 174–177 |
| $4\text{-}n\text{-}C_4H_9OC_6H_4$ | $4\text{-}n\text{-}C_4H_9OC_6H_4$ | $C_6H_5$ | 134 dec. |
| $C_6H_5$ | $C_6H_5$ | $4\text{-}BrC_6H_4$ | 261.5–263.5 |
| $C_6H_5$ | $C_6H_5$ | $3\text{-}BrC_6H_4$ | 303–304 |
| $C_6H_5$ | $C_6H_5$ | $2\text{-}BrC_6H_4$ | 203–205 |
| $4\text{-}CH_3OC_6H_4$ | $4\text{-}CH_3OC_6H_4$ | $3\text{-}BrC_6H_4$ | 248–251 |
| $C_6H_5$ | $4\text{-}BrC_6H_4$ | $4\text{-}BrC_6H_4$ | 289–291 |
| $C_6H_5$ | $4\text{-}BrC_6H_4$ | $C_6H_5$ | 254–255 |
| $4\text{-}BrC_6H_4$ | $4\text{-}BrC_6H_4$ | $4\text{-}BrC_6H_4$ | 284–285 |
| $4\text{-}BrC_6H_4$ | $4\text{-}BrC_6H_4$ | $C_6H_5$ | 305–307 |
| $4\text{-}n\text{-}C_4H_9OC_6H_4$ | $4\text{-}n\text{-}C_4H_9OC_6H_4$ | $4\text{-}BrC_6H_4$ | 80 dec. |
| $C_6H_5$ | $C_6H_5$ | $3\text{-}ClC_6H_4$ | 285–287 |
| $C_6H_5$ | $C_6H_5$ | $4\text{-}ClC_6H_4$ | 262–264 |
| $C_6H_5$ | $C_6H_5$ | $2,4\text{-}Cl_2C_6H_3$ | 174–176 |
| $4\text{-}CH_3OC_6H_4$ | $4\text{-}CH_3OC_6H_4$ | $2,4\text{-}Cl_2C_6H_3$ | 162–164 |
| $4\text{-}CH_3OC_6H_4$ | $4\text{-}CH_3OC_6H_4$ | $4\text{-}ClC_6H_4$ | 165 dec. |
| $C_6H_5$ | $4\text{-}BrC_6H_4$ | $4\text{-}ClC_6H_4$ | 273–274 |
| $3\text{-}CH_3OC_6H_4$ | $3\text{-}CH_3OC_6H_4$ | $4\text{-}ClC_6H_4$ | 215–217 |
| $4\text{-}BrC_6H_4$ | $4\text{-}BrC_6H_4$ | $4\text{-}ClC_6H_4$ | 279–280 |
| $2\text{-}CH_3OC_6H_4$ | $2\text{-}CH_3OC_6H_4$ | $4\text{-}ClC_6H_4$ | 192–195 |
| $2\text{-}CH_3C_6H_4$ | $2\text{-}CH_3C_6H_4$ | $4\text{-}BrC_6H_4$ | 280–281 |
| $2\text{-}CH_3C_6H_4$ | $2\text{-}CH_3C_6H_4$ | $4\text{-}CH_3OC_6H_4$ | 275–276 |
| $4\text{-}CH_3C_6H_4$ | $4\text{-}CH_3C_6H_4$ | $C_6H_5$ | 267.5–268 |
| $4\text{-}CH_3C_6H_4$ | $4\text{-}CH_3C_6H_4$ | $4\text{-}BrC_6H_4$ | 272–273 |
| $4\text{-}CH_3C_6H_4$ | $4\text{-}CH_3C_6H_4$ | $4\text{-}CH_3OC_6H_4$ | 246–247 |
| $C_6H_5$ | $C_6H_5$ | $4\text{-}CH_3C_6H_4$ | 232–235 |
| $4\text{-}CH_3OC_6H_4$ | $4\text{-}CH_3OC_6H_4$ | $4\text{-}CH_3C_6H_4$ | 186–188 |
| $4\text{-}CH_3C_6H_4$ | $4\text{-}CH_3C_6H_4$ | $4\text{-}CH_3SC_6H_4$ | 248–249 |
| $C_6H_5$ | $C_6H_5$ | $4\text{-}CH_3SC_6H_4$ | 234–238 |
| $4\text{-}CH_3OC_6H_4$ | $4\text{-}CH_3OC_6H_4$ | $4\text{-}CH_3SC_6H_4$ | 178 dec. |
| $4\text{-}CH_3OC_6H_4$ | $C_6H_5$ | $4\text{-}CH_3SC_6H_4$ | 194–200 |
| $4\text{-}CH_3SC_6H_4$ | $4\text{-}CH_3SC_6H_4$ | $C_6H_5$ | 290 dec. |
| $4\text{-}CH_3SC_6H_4$ | $4\text{-}CH_3SC_6H_4$ | $4\text{-}CH_3OC_6H_4$ | 99 dec. |
| $4\text{-}CH_3SC_6H_4$ | $4\text{-}CH_3SC_6H_4$ | $4\text{-}BrC_6H_4$ | 269 dec. |
| $4\text{-}CH_3SC_6H_4$ | $4\text{-}CH_3SC_6H_4$ | $4\text{-}CH_3SC_6H_4$ | 203 dec. |
| $C_6H_5$ | $C_6H_5$ | 2-pyridyl | 265–267 |
| $C_6H_5$ | $C_6H_5$ | 3-pyridyl | 230–234 |
| $C_6H_5$ | $C_6H_5$ | 4-pyridyl | 306 dec. |
| $4\text{-}CH_3OC_6H_4$ | $4\text{-}CH_3OC_6H_4$ | 3-pyridyl | 189–191 |
| 2-pyridyl | 2-pyridyl | $C_6H_5$ | 187–190 |
| 2-pyridyl | 2-pyridyl | $4\text{-}BrC_6H_4$ | 345 dec. |
| 2-pyridyl | 2-pyridyl | $4\text{-}CH_3OC_6H_4$ | 171–173 |
| 2-pyridyl | 2-pyridyl | $2,4\text{-}Cl_2C_6H_3$ | 129–132 |
| 2-pyridyl | 2-pyridyl | $4\text{-}ClC_6H_4$ | 172–175 |
| 2-pyridyl | 2-pyridyl | 2-pyridyl | 189–193 |
| 2-pyridyl | 2-pyridyl | $4\text{-}CH_3SC_6H_4$ | 300 dec. |
| $C_6H_5$ | $4\text{-}BrC_6H_4$ | 3-pyridyl | 235–236 |
| $C_6H_5$ | $4\text{-}CH_3OC_6H_4$ | 3-pyridyl | 230 dec. |
| $4\text{-}BrC_6H_4$ | $4\text{-}BrC_6H_4$ | 3-pyridyl | 305–306 |
| $C_6H_5$ | $C_6H_5$ | 2-thienyl | 262–266 |
| $4\text{-}CH_3OC_6H_4$ | $4\text{-}CH_3OC_6H_4$ | 2-thienyl | 192–195 |
| $4\text{-}CH_3OC_6H_4$ | $4\text{-}CH_3OC_6H_4$ | 2-furyl | 160 dec. |
| 2-furyl | 2-furyl | $C_6H_5$ | 193–195.5 |
| 2-furyl | 2-furyl | $4\text{-}CH_3OC_6H_4$ | 194–198 |
| $C_6H_5$ | $C_6H_5$ | $4\text{-}FC_6H_4$ | 251–253 |

EXAMPLE VI

Employing the experimental procedure of Example V, and starting with the appropriate reagents the following compounds are prepared:

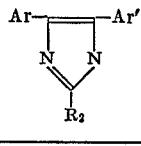

| Ar | Ar' | $R_2$ |
|---|---|---|
| $C_6H_5$ | $C_6H_5$ | $2\text{-}FC_6H_4$ |
| $C_6H_5$ | $C_6H_5$ | $2\text{-}ClC_6H_4$ |
| $C_6H_5$ | $C_6H_5$ | $2\text{-}C_2H_5C_6H_4$ |
| $C_6H_5$ | $C_6H_5$ | $4\text{-}t\text{-}C_4H_9C_6H_4$ |
| $C_6H_5$ | $C_6H_5$ | $4\text{-}s\text{-}C_4H_9OC_6H_4$ |
| $C_6H_5$ | $C_6H_5$ | $4\text{-}C_2H_5SC_6H_4$ |
| $2\text{-}FC_6H_4$ | $C_6H_5$ | $4\text{-}ClC_6H_4$ |
| $4\text{-}FC_6H_4$ | $C_6H_5$ | $2\text{-}CH_3OC_6H_4$ |
| $4\text{-}FC_6H_4$ | $C_6H_5$ | $4\text{-}n\text{-}C_4H_9C_6H_4$ |
| $4\text{-}FC_6H_4$ | $C_6H_5$ | $C_6H_5$ |
| $4\text{-}FC_6H_4$ | $C_6H_5$ | $4\text{-}CH_3SC_6H_4$ |
| $4\text{-}FC_6H_4$ | $C_6H_5$ | $4\text{-}ClC_6H_4$ |
| $4\text{-}FC_6H_4$ | $C_6H_5$ | 3-furyl |
| $4\text{-}ClC_6H_4$ | $C_6H_5$ | $C_6H_5$ |
| $4\text{-}ClC_6H_4$ | $C_6H_5$ | 2-thienyl |
| $4\text{-}ClC_6H_4$ | $C_6H_5$ | $4\text{-}s\text{-}C_4H_9OC_6H_4$ |
| $4\text{-}ClC_6H_4$ | $C_6H_5$ | $4\text{-}FC_6H_4$ |
| $4\text{-}ClC_6H_4$ | $2\text{-}ClC_6H_4$ | $4\text{-}CH_3C_6H_4$ |
| $4\text{-}ClC_6H_4$ | $2\text{-}ClC_6H_4$ | 4-pyridyl |
| $4\text{-}ClC_6H_4$ | $2\text{-}ClC_6H_4$ | $2\text{-}FC_6H_4$ |
| $4\text{-}ClC_6H_4$ | $4\text{-}FC_6H_4$ | $2\text{-}CH_3OC_6H_4$ |
| $4\text{-}ClC_6H_4$ | $4\text{-}FC_6H_4$ | $4\text{-}C_2H_5C_6H_4$ |
| $3\text{-}FC_6H_4$ | $4\text{-}FC_6H_4$ | $4\text{-}i\text{-}C_3H_7OC_6H_4$ |
| $3\text{-}FC_6H_4$ | $4\text{-}FC_6H_4$ | $4\text{-}CH_3C_6H_4$ |
| $2\text{-}BrC_6H_4$ | $C_6H_5$ | $3\text{-}CH_3OC_6H_4$ |
| $2\text{-}BrC_6H_4$ | $C_6H_5$ | $3\text{-}i\text{-}C_3H_7C_6H_4$ |
| $2\text{-}BrC_6H_4$ | $C_6H_5$ | $2,4\text{-}Cl_2C_6H_3$ |
| $2\text{-}BrC_6H_4$ | $C_6H_5$ | $3\text{-}i\text{-}C_3H_7SC_6H_4$ |
| $4\text{-}BrC_6H_4$ | $4\text{-}ClC_6H_4$ | $4\text{-}i\text{-}C_3H_7OC_6H_4$ |
| $4\text{-}BrC_6H_4$ | $4\text{-}ClC_6H_4$ | $2,4\text{-}Cl_2C_6H_3$ |
| $4\text{-}BrC_6H_4$ | $4\text{-}ClC_6H_4$ | $4\text{-}FC_6H_4$ |
| $4\text{-}FC_6H_4$ | $4\text{-}CH_3C_6H_4$ | 2-furyl |
| $4\text{-}FC_6H_4$ | $4\text{-}t\text{-}C_4H_9C_6H_4$ | 2-pyridyl |
| $4\text{-}CH_3C_6H_4$ | $C_6H_5$ | $C_6H_5$ |
| $4\text{-}CH_3C_6H_4$ | $C_6H_5$ | $4\text{-}CH_3OC_6H_4$ |
| $4\text{-}C_2H_5C_6H_4$ | $C_6H_5$ | $4\text{-}FC_6H_4$ |
| $4\text{-}C_2H_5C_6H_4$ | $C_6H_5$ | 3-furyl |
| $4\text{-}C_2H_5C_6H_4$ | $C_6H_5$ | 3-thienyl |
| $4\text{-}CH_3C_6H_4$ | $2\text{-}FC_6H_4$ | $4\text{-}BrC_6H_4$ |
| $4\text{-}CH_3C_6H_4$ | $2\text{-}FC_6H_4$ | $4\text{-}C_2H_5SC_6H_4$ |
| $4\text{-}CH_3C_6H_4$ | $2\text{-}FC_6H_4$ | 2-furyl |
| $4\text{-}CH_3C_6H_4$ | $2\text{-}FC_6H_4$ | 4-pyridyl |
| $4\text{-}CH_3C_6H_4$ | $3\text{-}C_2H_5OC_6H_4$ | $4\text{-}CH_3OC_6H_4$ |
| $4\text{-}CH_3C_6H_4$ | $3\text{-}C_2H_5OC_6H_4$ | $3\text{-}ClC_6H_4$ |
| $4\text{-}CH_3C_6H_4$ | $3\text{-}C_2H_5OC_6H_4$ | $2\text{-}FC_6H_4$ |
| $4\text{-}CH_3C_6H_4$ | $4\text{-}CH_3SC_6H_4$ | $4\text{-}CH_3OC_6H_4$ |
| $4\text{-}CH_3C_6H_4$ | $4\text{-}CH_3SC_6H_4$ | $2\text{-}FC_6H_4$ |
| $4\text{-}CH_3C_6H_4$ | $4\text{-}CH_3SC_6H_4$ | $2\text{-}ClC_6H_4$ |
| $4\text{-}C_2H_5SC_6H_4$ | $4\text{-}CH_3SC_6H_4$ | 2-thienyl |
| $4\text{-}C_2H_5SC_6H_4$ | $4\text{-}CH_3SC_6H_4$ | $2\text{-}i\text{-}C_3H_7C_6H_4$ |
| 2-furyl | $C_6H_5$ | $C_6H_5$ |
| 2-furyl | $C_6H_5$ | 3-thienyl |
| 2-furyl | 2-thienyl | $C_6H_5$ |
| 2-furyl | 2-thienyl | $4\text{-}C_2H_5OC_6H_4$ |
| 2-furyl | 2-thienyl | $C_6H_5$ |
| 2-furyl | 4-pyridyl | $C_6H_5$ |
| 2-furyl | $3,4\text{-}(CH_3O)_2C_6H_3$ | $C_6H_5$ |
| 3-thienyl | $C_6H_5$ | $C_6H_5$ |
| 3-thienyl | $C_6H_5$ | 2-furyl |
| 3-thienyl | $C_6H_5$ | 4-pyridyl |
| 2-pyridyl | 4-pyridyl | $2,4\text{-}Cl_2C_6H_3$ |
| 2-pyridyl | $3,4\text{-}(CH_3O)_2C_6H_3$ | 3-thienyl | and

| Ar | Ar' | $R_2$ |
|---|---|---|
| $C_6H_5$ | $C_6H_5$ | $2\text{-}CH_3C_6H_4$ |
| $C_6H_5$ | $C_6H_5$ | $4\text{-}C_2H_5OC_6H_4$ |
| $C_6H_5$ | $C_6H_5$ | $4\text{-}n\text{-}C_3H_7SC_6H_4$ |
| $2\text{-}FC_6H_4$ | $C_6H_5$ | $4\text{-}FC_6H_4$ |
| $2\text{-}FC_6H_4$ | $C_6H_5$ | $2\text{-}BrC_6H_4$ |
| $2\text{-}FC_6H_4$ | $C_6H_5$ | $C_6H_5$ |
| $4\text{-}FC_6H_4$ | $C_6H_5$ | $3\text{-}CH_3C_6H_4$ |
| $4\text{-}FC_6H_4$ | $C_6H_5$ | 2-thienyl |
| $4\text{-}ClC_6H_4$ | $C_6H_5$ | $4\text{-}C_2H_5OC_6H_4$ |
| $4\text{-}ClC_6H_4$ | $C_6H_5$ | $4\text{-}BrC_6H_4$ |
| $4\text{-}ClC_6H_4$ | $2\text{-}ClC_6H_4$ | $4\text{-}BrC_6H_4$ |
| $4\text{-}ClC_6H_4$ | $2\text{-}ClC_6H_4$ | $3\text{-}FC_6H_4$ |
| $3\text{-}ClC_6H_4$ | $4\text{-}FC_6H_4$ | $2\text{-}CH_3SC_6H_4$ |
| $4\text{-}ClC_6H_4$ | $4\text{-}FC_6H_4$ | $4\text{-}n\text{-}C_3H_7C_6H_4$ |
| $3\text{-}FC_6H_4$ | $4\text{-}FC_6H_4$ | $4\text{-}n\text{-}C_3H_7OC_6H_4$ |
| $3\text{-}FC_6H_4$ | $4\text{-}FC_6H_4$ | $2\text{-}BrC_6H_4$ |
| $2\text{-}BrC_6H_4$ | $C_6H_5$ | $4\text{-}C_2H_5OC_6H_4$ |
| $4\text{-}BrC_6H_4$ | $4\text{-}ClC_6H_4$ | $4\text{-}CH_3C_6H_4$ |

TABLE—Continued

| Ar | Ar' | R₂ |
|---|---|---|
| 4-BrC₆H₄ | 4-ClC₆H₄ | 4-BrC₆H₄ |
| 4-FC₆H₄ | 3-C₂H₅C₆H₄ | 4-CH₃OC₆H₄ |
| 4-CH₃C₆H₄ | C₆H₅ | 4-C₂H₅SC₆H₄ |
| 4-C₂H₅C₆H₄ | C₆H₅ | 3-pyridyl |
| 4-C₂H₅C₆H₄ | C₆H₅ | 2-thienyl |
| 4-C₂H₅C₆H₄ | C₆H₅ | 4-BrC₆H₄ |
| 4-CH₃C₆H₄ | 2-FC₆H₄ | 3-CH₃OC₆H₄ |
| 4-CH₃C₆H₄ | 2-FC₆H₄ | 4-t-C₄H₉SC₆H₄ |
| 4-CH₃C₆H₄ | 3-C₂H₅OC₆H₄ | 4-FC₆H₄ |
| 4-CH₃C₆H₄ | 4-CH₃SC₆H₄ | 4-i-C₃H₇OC₆H₄ |
| 4-C₂H₅SC₆H₄ | 4-CH₃SC₆H₄ | 4-BrC₆H₄ |
| 4-C₂H₅SC₆H₄ | 4-CH₃SC₆H₄ | 2-CH₃C₆H₄ |
| 4-C₂H₅SC₆H₄ | 4-CH₃SC₆H₄ | 4-n-C₄H₉OC₆H₄ |
| 2-furyl | C₆H₅ | 2-thienyl |
| 2-furyl | 2-thienyl | 4-BrC₆H₄ |
| 2-furyl | 2-thienyl | 2-FC₆H₄ |
| 2-furyl | 3-pyridyl | C₆H₅ |
| 2-furyl | 4-BrC₆H₄ | C₆H₅ |
| 3-thienyl | C₆H₅ | 4-CH₃OC₆H₄ |
| 2-pyridyl | 4-pyridyl | C₆H₅ |
| 2-pyridyl | 3,4-(CH₃O)₂C₆H₃ | 4-CH₃OC₆H₄ |
| 4-ClC₆H₄ | 3-CH₃OC₆H₄ | 2,4-Cl₂C₆H₃ |

EXAMPLE VII

2-isobutyl-4,5-diphenylimidazole

A yellow suspension of 4.2 g. (0.02 mole) of benzil, 2.0 g. (0.023 mole) of iso-valeraldehyde and 12 g. (0.156 mole) of ammonium acetate in 75 ml. of acetic acid is heated to reflux for 2 hours. An additional 20% of iso-valeraldehyde is added and heating continued for an additional 3.5 hours. The reaction mixture is diluted with 400 ml. of water and the clear solution neutralized with ammonium hydroxide. The oil which precipitates is separated from the aqueous layer and dried in vacuo followed by recrystallization from benzene, 0.5 g., M.P. 211–214° C.

*Analysis.*—Calcd. for $C_{19}H_{20}N_2$ (percent): C, 82.5; H, 7.3; N, 10.1. Found (percent): C, 81.9; H, 7.1; N, 9.9.

EXAMPLE VIII

Starting with the requisite reagents, and following the procedure of Example VII the following 2-alkyl-4,5-diaryl-imidazoles are synthesized:

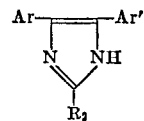

| Ar | Ar' | R₂ |
|---|---|---|
| C₆H₅ | C₆H₅ | CH₃ |
| C₆H₅ | C₆H₅ | C₂H₅ |
| C₆H₅ | C₆H₅ | n-C₃H₇ |
| C₆H₅ | C₆H₅ | s-C₄H₉ |
| C₆H₅ | 4-BrC₆H₄ | CH₃ |
| C₆H₅ | 4-BrC₆H₄ | n-C₄H₉ |
| C₆H₅ | 4-BrC₆H₄ | i-C₃H₇ |
| C₆H₅ | 2-FC₆H₄ | C₂H₅ |
| C₆H₅ | 2-FC₆H₄ | n-C₃H₇ |
| C₆H₅ | 2-FC₆H₄ | n-C₄H₉ |
| C₆H₅ | 4-FC₆H₄ | CH₃ |
| C₆H₅ | 4-ClC₆H₄ | CH₃ |
| C₆H₅ | 4-ClC₆H₄ | C₂H₅ |
| C₆H₅ | 4-ClC₆H₄ | n-C₃H₇ |
| 2-ClC₆H₄ | 4-ClC₆H₄ | CH₃ |
| 4-ClC₆H₄ | 4-FC₆H₄ | t-C₄H₉ |
| 4-ClC₆H₄ | 4-FC₆H₄ | n-C₄H₉ |
| 4-CH₃C₆H₄ | 4-FC₆H₄ | CH₃ |
| 4-CH₃C₆H₄ | 4-FC₆H₄ | C₂H₅ |
| 4-CH₃C₆H₄ | 4-FC₆H₄ | n-C₄H₉ |
| 4-BrC₆H₄ | 4-ClC₆H₄ | n-C₃H₇ |
| 4-BrC₆H₄ | 4-ClC₆H₄ | s-C₄H₉ |
| 4-CH₃C₆H₄ | C₆H₅ | CH₃ |
| 4-CH₃C₆H₄ | C₆H₅ | C₂H₅ |
| 4-CH₃C₆H₄ | C₆H₅ | n-C₃H₇ |
| 4-C₂H₅C₆H₄ | C₆H₅ | CH₃ |
| 4-C₂H₅C₆H₄ | C₆H₅ | C₂H₅ |
| 4-t-C₄H₉C₆H₄ | C₆H₅ | CH₃ |
| 4-t-C₄H₉C₆H₄ | C₆H₅ | n-C₃H₇ |
| 4-CH₃C₆H₄ | 2-FC₆H₄ | CH₃ |
| 4-CH₃C₆H₄ | 2-FC₆H₄ | i-C₃H₇ |
| 4-CH₃C₆H₄ | 2-FC₆H₄ | n-C₄H₉ |
| 4-CH₃C₆H₄ | 3-C₂H₅OC₆H₄ | C₂H₅ |
| 4-CH₃C₆H₄ | 3-C₂H₅OC₆H₄ | n-C₃H₇ |
| 4-CH₃C₆H₄ | 3-C₂H₅OC₆H₄ | s-C₄H₉ |
| 4-CH₃C₆H₄ | 4-CH₃SC₆H₄ | CH₃ |
| 4-CH₃C₆H₄ | 4-CH₃SC₆H₄ | n-C₃H₇ |
| 4-CH₃C₆H₄ | 4-CH₃SC₆H₄ | n-C₄H₉ |
| 4-CH₃C₆H₄ | 2-CH₃C₆H₄ | C₂H₅ |
| 4-CH₃C₆H₄ | 2-CH₃C₆H₄ | s-C₄H₉ |
| 4-C₂H₅SC₆H₄ | 4-CH₃SC₆H₄ | CH₃ |

TABLE—Continued

| Ar | Ar' | R₂ |
|---|---|---|
| 2-furyl | C₆H₅ | CH₃ |
| 2-furyl | 2-thienyl | CH₃ |
| 2-furyl | 4-pyridyl | CH₃ |
| 2-furyl | 3,4-(CH₃O)₂C₆H₃ | CH₃ |
| 2-furyl | 3,4-(CH₃O)₂C₆H₃ | C₂H₅ |
| 2-furyl | 3,4-(CH₃O)₂C₆H₃ | n-C₃H₇ |
| 3-thienyl | C₆H₅ | CH₃ |
| 2-pyridyl | 4-pyridyl | CH₃ |
| 2-pyridyl | 3,4-(CH₃O)₂C₆H₃ | CH₃ |

EXAMPLE IX

2,4-diphenyl-5-methylimidazole

A mixture of 1.04 g. (7 mmoles) of 1-phenyl-1,2-propanedione, 860 mg. (8.1 mmoles) of benzaldehyde and 6.47 g. (84 mmoles) of ammonium acetate in 50 ml. of acetic acid is heated to reflux, with continued stirring, for 2 hours. The reaction solution is cooled, added dropwise to 200 ml. of water and neutralized with ammonium hydroxide. The crude product is filtered, dried and recrystallized from ether, 1.4 g., M.P. 211.5–213° C. Further purification is effected by recrystallization from methanol-water, 960 mg., M.P. 214–215° C.

EXAMPLE X

Following the procedure of Example IX, and employing the appropriate starting diketone and aldehyde, the following analogs are prepared:

| Ar | Ar' | R₂ |
|---|---|---|
| C₆H₅ | C₆H₅ | C₂H₅ |
| C₆H₅ | C₆H₅ | n-C₄H₉ |
| C₆H₅ | 4-FC₆H₄ | CH₃ |
| C₆H₅ | 4-FC₆H₄ | C₂H₅ |
| C₆H₅ | 4-FC₆H₄ | i-C₃H₇ |
| C₆H₅ | 2-ClC₆H₄ | CH₃ |
| C₆H₅ | 2-ClC₆H₄ | C₂H₅ |
| C₆H₅ | 2-ClC₆H₄ | s-C₄H₉ |
| C₆H₅ | 2-ClC₆H₄ | n-C₄H₉ |
| C₆H₅ | 4-ClC₆H₄ | C₂H₅ |
| C₆H₅ | 4-ClC₆H₄ | t-C₄H₉ |
| C₆H₅ | 3-BrC₆H₄ | CH₃ |
| C₆H₅ | 3-BrC₆H₄ | C₂H₅ |
| C₆H₅ | 3-BrC₆H₄ | n-C₃H₇ |
| C₆H₅ | 4-BrC₆H₄ | n-C₃H₇ |
| C₆H₅ | 4-BrC₆H₄ | n-C₄H₉ |
| C₆H₅ | 2-CH₃C₆H₄ | CH₃ |
| C₆H₅ | 2-CH₃C₆H₄ | C₂H₅ |
| C₆H₅ | 2-n-C₃H₇C₆H₄ | CH₃ |
| C₆H₅ | 4-CH₃C₆H₄ | CH₃ |
| C₆H₅ | 4-CH₃C₆H₄ | C₂H₅ |
| C₆H₅ | 4-CH₃C₆H₄ | n-C₃H₇ |
| C₆H₅ | 4-C₂H₅C₆H₄ | C₂H₅ |
| C₆H₅ | 4-C₂H₅C₆H₄ | n-C₃H₇ |
| C₆H₅ | 4-C₂H₅C₆H₄ | n-C₄H₉ |
| C₆H₅ | 4-C₂H₅C₆H₄ | s-C₄H₉ |
| C₆H₅ | 3-CH₃OC₆H₄ | CH₃ |
| C₆H₅ | 4-CH₃OC₆H₄ | CH₃ |
| C₆H₅ | 4-CH₃OC₆H₄ | C₂H₅ |
| C₆H₅ | 4-CH₃OC₆H₄ | i-C₃H₇ |
| C₆H₅ | 3,4-(CH₃O)₂C₆H₃ | CH₃ |
| C₆H₅ | 3,4-(CH₃O)₂C₆H₃ | n-C₃H₇ |
| C₆H₅ | 2,4-Cl₂C₆H₃ | CH₃ |
| C₆H₅ | 2,4-Cl₂C₆H₃ | n-C₃H₇ |
| C₆H₅ | 3-C₂H₅SC₆H₄ | CH₃ |
| C₆H₅ | 4-n-C₄H₉SC₆H₄ | CH₃ |
| C₆H₅ | 4-n-C₄H₉SC₆H₄ | C₂H₅ |
| 2-FC₆H₄ | C₆H₅ | CH₃ |
| 2-FC₆H₄ | C₆H₅ | i-C₃H₇ |
| 2-FC₆H₄ | C₆H₅ | n-C₄H₉ |
| 4-FC₆H₄ | C₆H₅ | CH₃ |
| 4-FC₆H₄ | C₆H₅ | t-C₄H₉ |
| 4-FC₆H₄ | 4-FC₆H₄ | CH₃ |
| 4-FC₆H₄ | 4-FC₆H₄ | C₂H₅ |
| 4-FC₆H₄ | 4-FC₆H₄ | n-C₃H₇ |
| 4-FC₆H₄ | 4-ClC₆H₄ | CH₃ |
| 4-FC₆H₄ | 3-ClC₆H₄ | CH₃ |
| 4-FC₆H₄ | 4-BrC₆H₄ | CH₃ |
| 4-FC₆H₄ | 3-CH₃C₆H₄ | CH₃ |
| 4-FC₆H₄ | 4-CH₃OC₆H₄ | CH₃ |
| 4-FC₆H₄ | 4-CH₃SC₆H₄ | CH₃ |
| 4-ClC₆H₄ | C₆H₅ | C₂H₅ |
| 4-ClC₆H₄ | C₆H₅ | n-C₄H₉ |
| 4-ClC₆H₄ | C₆H₅ | s-C₄H₉ |
| 2-BrC₆H₄ | C₆H₅ | CH₃ |
| 4-BrC₆H₄ | 4-FC₆H₄ | CH₃ |
| 4-BrC₆H₄ | 3-ClC₆H₄ | CH₃ |
| 4-BrC₆H₄ | 3-CH₃C₆H₄ | C₂H₅ |
| 4-BrC₆H₄ | 3-CH₃C₆H₄ | CH₃ |
| 4-BrC₆H₄ | 4-n-C₄H₉OC₆H₄ | CH₃ |
| 4-BrC₆H₄ | 4-n-C₄H₉OC₆H₄ | C₂H₅ |
| 4-BrC₆H₄ | 4-n-C₄H₉OC₆H₄ | n-C₃H₇ |
| 4-C₂H₅C₆H₄ | C₆H₅ | C₂H₅ |

TABLE—Continued

| Ar | Ar' | R₂ |
|---|---|---|
| 4-t-C₄H₉C₆H₄ | C₆H₅ | CH₃ |
| 4-CH₃C₆H₄ | 4-FC₆H₄ | CH₃ |
| 4-CH₃C₆H₄ | 4-ClC₆H₄ | CH₃ |
| 4-CH₃C₆H₄ | 4-ClC₆H₄ | C₂H₅ |
| 4-CH₃C₆H₄ | 3-BrC₆H₄ | CH₃ |
| 4-CH₃C₆H₄ | 4-CH₃C₆H₄ | CH₃ |
| 4-CH₃C₆H₄ | 4-n-C₄H₉C₆H₄ | CH₃ |
| 4-n-C₃H₇C₆H₄ | 4-CH₃OC₆H₄ | CH₃ |
| 4-n-C₃H₇C₆H₄ | 2-CH₃SC₆H₄ | CH₃ |
| 4-CH₃OC₆H₄ | 2-FC₆H₄ | C₂H₅ |
| 4-CH₃OC₆H₄ | 4-BrC₆H₄ | CH₃ |
| 4-CH₃OC₆H₄ | 4-BrC₆H₄ | C₂H₅ |
| 3-CH₃SC₆H₄ | 2-CH₃OC₆H₄ | CH₃ |
| 3-CH₃SC₆H₄ | 4-CH₃SC₆H₄ | CH₃ |
| 3-CH₃SC₆H₄ | 3,4-(CH₃O)₂C₆H₃ | CH₃ |
| 3,4-(CH₃O)₂C₆H₃ | 3,4-(CH₃O)₂C₆H₃ | C₂H₅ |
| 3,4-(CH₃O)₂C₆H₃ | 3,4-(CH₃O)₂C₆H₃ | n-C₄H₉ |
| 2-furyl | 4-FC₆H₄ | CH₃ |
| 2-furyl | 4-ClC₆H₄ | CH₃ |
| 2-furyl | 4-ClC₆H₄ | C₂H₅ |
| 3-furyl | C₆H₅ | C₂H₅ |
| 3-furyl | 4-C₂H₅OC₆H₄ | CH₃ |
| 2-thienyl | 4-BrC₆H₄ | CH₃ |
| 2-thienyl | 3,4-(CH₃O)₂C₆H₃ | CH₃ |
| 2-pyridyl | 3-n-C₃H₇SC₆H₄ | C₂H₅ |
| 2-pyridyl | 2-furyl | CH₃ |
| 4-pyridyl | 2-thienyl | n-C₃H₇ |
| 4-pyridyl | 4-CH₃C₆H₄ | CH₃ |
| 4-pyridyl | 4-ClC₆H₄ | CH₃ |
| 4-pyridyl | 4-pyridyl | CH₃ |

EXAMPLE XI 2,4-diphenyl-5-trifluoromethylimidazole

To a solution of 1.0 g. (4.5 mmoles) of 1-phenyl-3,3,3-trifluoro-1,2-propanedione in 25 ml. of dry glacial acetic acid under nitrogen is added 2.0 g. of ammonium acetate followed by 573 mg. (5.4 mmoles) of benzaldehyde in 10 ml. of glacial acetic acid. The reaction mixture is heated to reflux for 5.5 hours, cooled to room temperature and added to 400 ml. of ice and water. The pH is adjusted to 7 with ammonium hydroxide solution and the resulting precipitate filtered, washed with water and dried, 858 mg., M.P. 222–224° C. Recrystallization from isopropanol-water provides the purified product, M.P. 234–234.5° C.

*Analysis.*—Calcd. for $C_{16}H_{11}F_3N_2$ (percent): C, 66.7; H, 3.9; N, 9.7. Found (percent): C, 66.5; H, 4.0; N, 9.5. Similarly are prepared:

2-(p-methoxy)-4-phenyl-5-trifluoromethylimidazole, M.P. 253–255° C.;

2-(p-bromophenyl)-4-phenyl-5-trifluoromethylimidazole, M.P. 260–278° C.;

2-(3-pyridyl)-4-phenyl-5-trifluoromethylimidazole, M.P. 237–238° C.;

2-(p-chlorophenyl)-4-phenyl-5-trifluoromethylimidazole, M.P. 232–245° C. and 2-(p-methylthiophenyl)-4-phenyl-5-trifluoromethylimidazole, M.P. 222–235° C.

EXAMPLE XII

Starting with an appropriately substituted 1-aryl-3,3,3-trifluoro-1,2-propanedione and the requisite aldehyde, and employing the experimental conditions of Example XI, the following 2,4 - diaryl-5-trifluoromethylimidazoles are prepared:

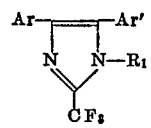

| Ar | Ar' | Ar | Ar' |
|---|---|---|---|
| C₆H₅ | 4-FC₆H₄ | 4-CH₃OC₆H₄ | 3,4-(CH₃O)₂C₆H₃ |
| 2-FC₆H₄ | 4-FC₆H₄ | 4-CH₃OC₆H₄ | 4-ClC₆H₄ |
| 2-FC₆H₄ | 3-BrC₆H₄ | 4-CH₃OC₆H₄ | 4-CH₃SC₆H₄ |
| 4-FC₆H₄ | 4-ClC₆H₄ | 3-n-C₄H₉SC₆H₄ | C₆H₅ |
| 4-ClC₆H₄ | 2-ClC₆H₄ | 3-C₂H₅OC₆H₄ | C₆H₅ |
| 4-ClC₆H₄ | 2-BrC₆H₄ | C₆H₅ | 2-pyridyl |
| 3-BrC₆H₄ | 4-FC₆H₄ | C₆H₅ | 4-pyridyl |
| 3-BrC₆H₄ | 4-CH₃C₆H₄ | 2-furyl | C₆H₅ |
| C₆H₅ | 4-CH₃C₆H₄ | 4-pyridyl | 3-thienyl |
| C₆H₅ | 2-CH₃SC₆H₄ | 2-thienyl | 2-thienyl |
| C₆H₅ | 4-n-C₄H₉SC₆H₄ | 4-CH₃SC₆H₄ | 4-CH₃SC₆H₄ |
| 4-ClC₆H₄ | 4-C₂H₅OC₆H₄ | 2-furyl | 3,4-(CH₃O)₂C₆H₃ |
| 4-ClC₆H₄ | 2-furyl | 3-furyl | 3,4-(CH₃O)₂C₆H₃ |
| 4-i-C₃H₇C₆H₄ | 4-CH₃C₆H₄ | 3-furyl | 4-C₂H₅C₆H₄ |
| 4-i-C₃H₇C₆H₄ | 2-thienyl | 4-FC₆H₄ | C₆H₅ |
| 4-pyridyl | 4-CH₃C₆H₄ | 4-ClC₆H₄ | C₆H₅ |
| | | 2-BrC₆H₄ | C₆H₅ |

EXAMPLE XIII 1-methyl-2-trifluoromethyl-4,5-bis(p-methoxyphenyl)imidazole

To a suspension of 140 mg. (2.9 mmoles) of 50% sodium hydride in 5 ml. of dimethylformamide is added 1 g. (2.9 mmoles) of 2-trifluoromethyl-4,5-bis(p-methoxyphenyl)imidazole in 20 ml. of the same solvent. After 2 hours of stirring at room temperature the suspension of sodium salt is treated with 410 mg. (2.9 mmoles) of methyl iodide in 10 ml. of dimethylformamide and the reaction mixture heated on a steam bath for 2 hours. The resulting yellow solution is poured into water and the resulting precipitate filtered, dried and recrystallized from hexane, 673 mg., M.P. 127–129.5° C.

*Analysis.*—Calcd. for $C_{19}H_{17}F_3O_2N_2$ (percent): C, 63.0; H, 4.7; N, 7.7. Found (percent): C, 63.2; H, 4.8; N, 7.8.

In a similar manner, employing the appropriate alkyl- or alkenyl halide the following congeners are prepared:

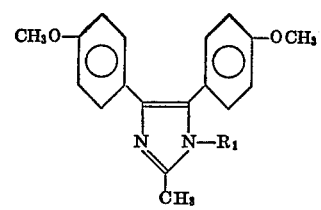

| R₁ | M.P., ° C. |
|---|---|
| C₂H₅ | 119 dec. |
| n-C₃H₇ | 102–105 |
| CH₂CH=CH₂ | 62 |

EXAMPLE XIV

Starting with the requisite 2-trifluoro-4,5-diarylimidazole and alkyl- or alkenyl halide, and repeating the experimental conditions of Example XIII, the following analogs are synthesized:

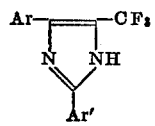

| Ar | Ar' | R₁ |
|---|---|---|
| C₆H₅ | C₆H₅ | CH₃ |
| C₆H₅ | 4-BrC₆H₄ | CH₃ |
| C₆H₅ | 4-BrC₆H₄ | C₂H₅ |
| C₆H₅ | 4-BrC₆H₄ | CH₂=CHCH₂ |
| C₆H₅ | 4-CH₃OC₆H₄ | C₂H₅ |
| C₆H₅ | 4-OCH₃C₆H₄ | CH(CH₃)=CHCH₃ |
| 4-BrC₆H₄ | C₆H₅ | CH₃ |
| 4-BrC₆H₄ | C₆H₅ | C₂H₅ |
| 4-BrC₆H₄ | C₆H₅ | CH₂=CHCH₂ |
| 4-CH₃OC₆H₄ | C₆H₅ | C₂H₅ |
| 4-CH₃OC₆H₄ | C₆H₅ | CH(CH₃)=CHCH₂ |
| 4-BrC₆H₄ | 4-BrC₆H₄ | CH₃ |
| 4-BrC₆H₄ | 4-BrC₆H₄ | C₂H₅ |
| 4-BrC₆H₄ | 4-BrC₆H₄ | n-C₄H₉ |
| 2-CH₃OC₆H₄ | 2-CH₃OC₆H₄ | CH₃ |
| 2-CH₃OC₆H₄ | 2-CH₃OC₆H₄ | s-C₄H₉ |
| 3,4-(CH₃O)₂C₆H₃ | 3,4-(CH₃O)₂C₆H₃ | CH₃ |
| 3,4-(CH₃O)₂C₆H₃ | 3,4-(CH₃O)₂C₆H₃ | C₂H₅ |
| 3,4-(CH₃O)₂C₆H₃ | 3,4-(CH₃O)₂C₆H₃ | i-C₃H₇ |
| 4-FC₆H₄ | 4-CH₃OC₆H₄ | CH₃ |
| 4-CH₃OC₆H₄ | 4-FC₆H₄ | CH₃ |
| 3-ClC₆H₄ | 4-C₂H₅C₆H₄ | C₂H₅ |
| 4-C₂H₅C₆H₄ | 3-ClC₆H₄ | C₂H₅ |
| 2-thienyl | 2-thienyl | CH₃ |
| 2-thienyl | 2-thienyl | C₂H₅ |
| 2-thienyl | 2-thienyl | CH₂=C(CH₃)CH₃ |
| 2-thienyl | 2-thienyl | n-C₄H₉ |
| 3-furyl | 4-ClC₆H₄ | CH₃ |
| 4-ClC₆H₄ | 3-furyl | CH₃ |
| 4-n-C₄H₉C₆H₄ | 4-pyridyl | CH₃ |
| 4-n-C₄H₈C₆H₄ | 4-pyridyl | C₂H₅ |
| 4-pyridyl | 4-n-C₄H₉C₆H₄ | CH₃ |
| 4-pyridyl | 4-n-C₄H₉C₆H₄ | C₂H₅ |
| 4-CH₃SC₆H₄ | 4-CH₃SC₆H₄ | CH₃ |
| 4-CH₃SC₆H₄ | 4-CH₃SC₆H₄ | C₂H₅ |
| 4-CH₃SC₆H₄ | 4-CH₃SC₆H₄ | n-C₃H₇ |
| 4-CH₃SC₆H₄ | 4-CH₃SC₆H₄ | CH₂=CHCH(CH₃) |
| 2-CH₃OC₆H₄ | 4-n-C₄H₉SC₆H₄ | CH₃ |
| 4-n-C₄H₉SC₆H₄ | 2-CH₃OC₆H₄ | CH₃ |

EXAMPLE XV 1-methyl-2-(p-bromophenyl)-4,5-diphenylimidazole

To a suspension of 82 mg. (1.7 mmoles) of 50% sodium hydride in 5 ml. of dimethylformamide is added 500 mg. (1.3 mmoles) of 2-(p-bromophenyl)-4,5-diphenylimidazole in 25 ml. of the same solvent and the mixture allowed to stir for 30 minutes at room temperature. Methyl iodide (190 mg.; 1.33 mmoles) in 10 ml. of ethyl ether is then added dropwise and the mixture heated on a steam bath for 4 hours. The reaction is poured into water and the resulting product filtered and dried, 403 mg., M.P. 199–202° C.

*Analysis.*—Calcd. for $C_{22}H_{12}BrN_2$ (percent): C, 67.8; H, 4.4; N, 7.2. Found (percent): C, 67.8; H, 4.7; N, 7.4.

Repeating the above procedure with the appropriate alkyl- or alkenyl halides the following analogs are prepared:

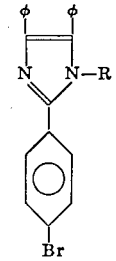

| $R_1$ | M.P., ° C. |
| --- | --- |
| $C_2H_5$ | 146–149 |
| $n-C_3H_7$ | 107–110 |
| $n-C_4H_9$ | 107–110 |
| $CH_2=CH-CH_2$ | 111–114 |
| $CH_2=C-CH_2$<br>$\quad\ \ |$<br>$\quad\ \ CH_3$ | 134–137 |

EXAMPLE XVI

The procedure of Example XV is repeated, using the requisite starting reagents, to provide the following compounds:

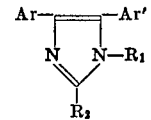

| Ar | Ar' | $R_1$ | $R_2$ |
| --- | --- | --- | --- |
| $C_6H_5$ | $C_6H_5$ | $CH_3$ | $2-ClC_6H_4$ |
| $C_6H_5$ | $C_6H_5$ | $CH_3$ | $2-C_2H_5C_6H_4$ |
| $C_6H_5$ | $C_6H_5$ | $C_2H_5$ | $2-C_2H_5C_6H_4$ |
| $C_6H_5$ | $C_6H_5$ | $CH_2=CHCH_2$ | $2-C_2H_5C_6H_4$ |
| $C_6H_5$ | $C_6H_5$ | $CH_3$ | $4-s-C_4H_9OC_6H_4$ |
| $C_6H_5$ | $C_6H_5$ | $C_2H_5$ | $4-C_2H_5SC_6H_4$ |
| $C_6H_5$ | $C_6H_5$ | $n-C_4H_9$ | $4-C_2H_5SC_6H_4$ |
| $4-FC_6H_4$ | $C_6H_5$ | $CH_3$ | $2-CH_3OC_6H_4$ |
| $C_6H_5$ | $4-FC_6H_4$ | $n-C_4H_9$ | $2-CH_3OC_6H_4$ |
| $4-FC_6H_4$ | $C_6H_5$ | $n-C_4H_9$ | $2-CH_3OC_6H_4$ |
| $C_6H_5$ | $4-FC_6H_4$ | $CH_3$ | $2-CH_3OC_6H_4$ |
| $4-ClC_6H_4$ | $C_6H_5$ | $CH_3$ | $C_6H_5$ |
| $C_6H_5$ | $4-ClC_6H_4$ | $CH_3$ | $C_6H_5$ |
| $4-ClC_6H_4$ | $C_6H_5$ | $C_2H_5$ | 2-thienyl |
| $C_6H_5$ | $4-ClC_6H_4$ | $C_2H_5$ | 2-thienyl |
| $4-ClC_6H_4$ | $2-ClC_6H_4$ | $n-C_4H_9$ | 4-pyridyl |
| $3-FC_6H_4$ | $4-FC_6H_4$ | $CH_3$ | $4-CH_3C_6H_4$ |
| $3-FC_6H_4$ | $4-FC_6H_4$ | $C_2H_5$ | $4-CH_3C_6H_4$ |
| $4-FC_6H_4$ | $3-FC_6H_4$ | $CH_3$ | $4-CH_3C_6H_4$ |
| $4-FC_6H_4$ | $3-FC_6H_4$ | $C_2H_5$ | $4-CH_3C_6H_4$ |
| $2-BrC_6H_4$ | $C_6H_5$ | $n-C_3H_7$ | $3-CH_3OC_6H_4$ |
| $2-BrC_6H_4$ | $C_6H_5$ | $i-C_3H_7$ | $3-CH_3OC_6H_4$ |
| $C_6H_5$ | $2-BrC_6H_4$ | $i-C_3H_7$ | $3-CH_3OC_6H_4$ |
| $C_6H_5$ | $2-BrC_6H_4$ | $n-C_3H_7$ | $3-CH_3OC_6H_4$ |
| $2-BrC_6H_4$ | $C_6H_5$ | $CH_3$ | $3-i-C_3H_7SC_6H_4$ |
| $C_6H_5$ | $2-BrC_6H_4$ | $CH_3$ | $3-i-C_3H_7SC_6H_4$ |
| $2-BrC_6H_4$ | $C_6H_5$ | $C_2H_5$ | $2,4-Cl_2C_6H_3$ |
| $2-BrC_6H_4$ | $C_6H_5$ | $n-C_4H_9$ | $2,4-Cl_2C_6H_3$ |
| $C_6H_5$ | $2-BrC_6H_4$ | $n-C_4H_9$ | $2,4-Cl_2C_6H_3$ |
| $C_6H_5$ | $2-BrC_6H_4$ | $C_2H_5$ | $2,4-Cl_2C_6H_3$ |
| $4-BrC_6H_4$ | $4-ClC_6H_4$ | $CH_3$ | $4-FC_6H_4$ |
| $4-BrC_6H_4$ | $4-ClC_6H_4$ | $i-C_3H_7$ | $4-FC_6H_4$ |
| $4-ClC_6H_4$ | $4-BrC_6H_4$ | $i-C_3H_7$ | $4-FC_6H_4$ |
| $4-ClC_6H_4$ | $4-BrC_6H_4$ | $CH_3$ | $4-FC_6H_4$ |
| $4-CH_3C_6H_4$ | $C_6H_5$ | $CH_3$ | $4-CH_3OC_6H_4$ |
| $C_6H_5$ | $4-CH_3C_6H_4$ | $CH_3$ | $4-CH_3OC_6H_4$ |
| $4-C_2H_5C_6H_4$ | $C_6H_5$ | $CH_3$ | 3-furyl |
| $4-C_2H_5C_6H_4$ | $C_6H_5$ | $s-C_4H_9$ | 3-furyl |
| $C_6H_5$ | $4-C_2H_5C_6H_4$ | $s-C_4H_9$ | 3-furyl |
| $C_6H_5$ | $4-C_2H_5C_6H_4$ | $CH_3$ | 3-furyl |
| $4-CH_3C_6H_4$ | $2-FC_6H_4$ | $CH_3$ | $3-C_2H_5SC_6H_4$ |
| $4-CH_3C_6H_4$ | $2-FC_6H_4$ | $CH_2=CHCH_2$ | $4-C_2H_5SC_6H_4$ |
| $2-FC_6H_4$ | $4-CH_3C_6H_4$ | $CH_2=CHCH_2$ | $4-C_2H_5SC_6H_4$ |
| $2-FC_6H_4$ | $4-CH_3C_6H_4$ | $CH_3$ | $4-C_2H_5SC_6H_4$ |
| $4-CH_3C_6H_4$ | $3-C_2H_5OC_6H_4$ | $CH_2=CHCH_2$ | $2-FC_6H_4$ |
| $4-CH_3C_6H_4$ | $3-C_2H_5OC_6H_4$ | $CH(CH_3)=CHCH_2$ | $2-FC_6H_4$ |
| $3-C_2H_5OC_6H_4$ | $4-CH_3C_6H_4$ | $CH(CH_3)=CHCH_2$ | $2-FC_6H_4$ |
| $3-C_2H_5OC_6H_4$ | $4-CH_3C_6H_4$ | $CH_2=CHCH_2$ | $2-FC_6H_4$ |
| $4-C_2H_5SC_6H_4$ | $4-CH_3SC_6H_4$ | $CH_3$ | $2-i-C_3H_7C_6H_4$ |
| $4-C_2H_5SC_6H_4$ | $4-CH_3SC_6H_4$ | $CH_2=C(CH_3)CH_2$ | $2-i-C_3H_7C_6H_4$ |
| $4-CH_3SC_6H_4$ | $4-C_2H_5SC_6H_4$ | $CH_2=C(CH_3)CH_2$ | $2-i-C_3H_7C_6H_4$ |
| $4-CH_3SC_6H_4$ | $4-C_2H_5SC_6H_4$ | $CH_3$ | $2-i-C_3H_7C_6H_4$ |
| 2-furyl | 2-thienyl | $CH_3$ | $C_6H_5$ |
| 2-thienyl | 2-furyl | $CH_3$ | $C_6H_5$ |
| 2-furyl | $3,4-(CH_3O)_2C_6H_3$ | $C_2H_5$ | $C_6H_5$ |
| $3,4-(CH_3O)_2C_6H_3$ | 2-furyl | $C_2H_5$ | $C_6H_5$ |
| 3-thienyl | $C_6H_5$ | $CH_2=CHCH_2$ | 4-pyridyl |
| $C_6H_5$ | 3-thienyl | $CH_2=CHCH_2$ | 4-pyridyl |
| 2-pyridyl | $3,4-(CH_3O)_2C_6H_3$ | $CH_3$ | 3-thienyl |
| $3,4-(CH_3O)_2C_6H_3$ | 2-pyridyl | $CH_3$ | 3-thienyl | and

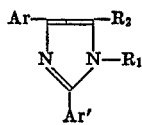

| Ar | Ar' | R₁ | R₂ |
|---|---|---|---|
| C₆H₅ | C₆H₅ | CH₃ | 2-CH₃C₆H₄ |
| 2-CH₃C₆H₄ | C₆H₅ | CH₃ | C₆H₅ |
| 2-CH₃C₆H₄ | C₆H₅ | C₂H₅ | C₆H₅ |
| C₆H₅ | C₆H₅ | C₂H₅ | 2-CH₃C₆H₄ |
| C₆H₅ | C₆H₅ | CH₃ | 4-n-C₃H₇SC₆H₄ |
| 4-n-C₃H₇SC₆H₄ | C₆H₅ | CH₃ | C₆H₅ |
| 2-FC₆H₄ | C₆H₅ | CH₂=CHCH₂ | 4-FC₆H₄ |
| 4-FC₆H₄ | C₆H₅ | CH₂=CHCH₂ | 2-FC₆H₄ |
| 4-FC₆H₄ | C₆H₅ | CH(CH₃)=CHCH₂ | 3-CH₃C₆H₄ |
| 3-CH₃C₆H₄ | C₆H₅ | CH(CH₃)=CHCH₂ | 4-FC₆H₄ |
| 4-FC₆H₄ | C₆H₅ | n-C₄H₉ | 2-thienyl |
| 2-thienyl | C₆H₅ | n-C₄H₉ | 4-FC₆H₄ |
| 4-ClC₆H₄ | C₆H₅ | i-C₃H₇ | 4-BrC₆H₄ |
| 4-BrC₆H₄ | C₆H₅ | i-C₃H₇ | 4-ClC₆H₄ |
| 4-ClC₆H₄ | 2-ClC₆H₄ | CH₃ | 3-FC₆H₄ |
| 3-FC₆H₄ | 2-ClC₆H₄ | CH₃ | 4-ClC₆H₄ |
| 3-ClC₆H₄ | 4-FC₆H₄ | C₂H₅ | 2-CH₃SC₆H₄ |
| 2-CH₃SC₆H₄ | 4-FC₆H₄ | C₂H₅ | 3-ClC₆H₄ |
| 3-FC₆H₄ | 4-FC₆H₄ | n-C₃H₇ | 4-n-C₃H₇OC₆H₄ |
| 4-n-C₃H₇OC₆H₄ | 4-FC₆H₄ | n-C₃H₇ | 3-FC₆H₄ |
| 4-BrC₆H₄ | 4-ClC₆H₄ | CH₂=C(CH₃)CH₂ | 4-CH₃C₆H₄ |
| 4-CH₃C₆H₄ | 4-ClC₆H₄ | CH₂=C(CH₃)CH₂ | 4-BrC₆H₄ |
| 4-CH₃C₆H₄ | C₆H₅ | C₂H₅ | 4-C₂H₅SC₆H₄ |
| 4-C₂H₅SC₆H₄ | C₆H₅ | C₂H₅ | 4-CH₃C₆H₄ |
| 4-C₂H₅C₆H₄ | C₆H₅ | CH₂=CHCH(CH₃) | 3-pyridyl |
| 3-pyridyl | C₆H₅ | CH₂=CHCH(CH₃) | 4-C₂H₅C₆H₄ |
| 4-CH₃C₆H₄ | 3-C₂H₅OC₆H₄ | CH₃ | 4-FC₆H₄ |
| 4-FC₆H₄ | 3-C₂H₅OC₆H₄ | CH₃ | 4-CH₃C₆H₄ |
| 4-C₂H₅SC₆H₄ | 4-CH₃SC₆H₄ | n-C₃H₇ | 4-n-C₄H₉OC₆H₄ |
| 4-n-C₄H₉C₆H₄ | 4-CH₃SC₆H₄ | n-C₃H₇ | 4-C₂H₅SC₆H₄ |
| 2-furyl | 4-CH₃SC₆H₄ | s-C₄H₉ | 4-n-C₄H₉OC₆H₄ |
| 4-n-C₄H₉C₆H₄ | 4-CH₃SC₆H₄ | s-C₄H₉ | 2-furyl |
| 2-furyl | 2-thienyl | CH₃ | 2-FC₆H₄ |
| 2-FC₆H₄ | 2-thienyl | CH₃ | 2-furyl |
| 2-furyl | 3-pyridyl | C₂H₅ | C₆H₅ |
| C₆H₅ | 3-pyridyl | C₂H₅ | 2-furyl |
| 3-thienyl | C₆H₅ | C₂H₅ | 4-CH₃OC₆H₄ |
| 4-CH₃OC₆H₄ | C₆H₅ | C₂H₅ | 3-thienyl |
| 2-pyridyl | 3,4-(CH₃O)₂C₆H₃ | t-C₄H₉ | 4-CH₃OC₆H₄ |
| 4-CH₃OC₆H₄ | 3,4-(CH₃O)₂C₆H₃ | t-C₄H₉ | 2-pyridyl |
| 4-ClC₆H₄ | 3-CH₃OC₆H₄ | CH₃ | 2-4-Cl₂C₆H₃ |
| 2-4-Cl₂C₆H₃ | 3-CH₃OC₆H₄ | CH₃ | 4-ClC₆H₄ |

EXAMPLE XVII

Tablets

A tablet base is prepared by blending the following ingredients in the proportion by weight indicated:

| | |
|---|---|
| Sucrose, U.S.P. | 80.3 |
| Tapioca starch | 13.2 |
| Magnesium stearate | 6.5 |

Into this tablet base there is blended sufficient 2-trifluoromethyl-4,5-bis(p-methoxyphenyl)imidazole hydrochloride to provide tablets containing 20, 100 and 250 mg. of active ingredient per tablet. The compositions are each compressed into tablets, each weighing 360 mg., by conventional means.

EXAMPLE XVIII

Capsules

A blend is prepared containing the following ingredients:

| | |
|---|---|
| Calcium carbonate, U.S.P. | 17.6 |
| Dicalcium phosphate | 18.8 |
| Magnesium trisilicate, U.S.P. | 5.2 |
| Lactose, U.S.P. | 5.2 |
| Potato starch | 5.2 |
| Magnesium stearate A | 0.8 |
| Magnesium stearate B | 0.35 |

To this blend is added sufficient 2-trifluoromethyl-4,5-bis(p-methylthiophenyl)imidazol hydrochloride to provide capsules containing 20, 100 and 250 mg. of active ingredient per capsule. The compositions are filled into conventional hard gelatin capsules in the amount of 350 mg. per capsule.

EXAMPLE XIX

Injectable preparation

One thousand grams of 2-trifluoromethyl-4,5-bis(p-ethoxyphenyl)imidazole hydrochloride are intimately mixed and ground with 2500 grams of sodium ascorbate. The ground dry mixture is placed in vials and sterilized with ethylene oxide after which the vials are sterilely stoppered. For intravenous administration, sufficient water is added to the materials in the vials to form a solution containing 10 mg. of active ingredient per milliliter of injectable solution.

EXAMPLE XX

Suspension

A suspension of 2-trifluoromethyl-4,5-bis(p-tolyl)imidazole is prepared with the following composition:

| | | |
|---|---|---|
| Effective ingredient | g | 25.00 |
| 70% aqueous sorbitol | g | 741.29 |
| Glycerine, U.S.P. | g | 185.35 |
| Gum acacia (10% solution) | ml | 100.00 |
| Polyvinylpyrrolidone | g | 0.50 |
| Distilled water, sufficient to make 1 liter. | | |

To this suspension, various sweeteners and flavorants are added to improve the palatability of the suspension. The suspension contains approximately 25 mg. of effective agent per milliliter.

EXAMPLE XXI

Solid dispersion

A solid dispersion containing 20% 2-trifluoromethyl-4,5-bis(p-methoxyphenyl)imidazole and 80% polyethylene glycol 6000 (PEG 6000) is prepared by adding in small portions and with constant stirring 100 g. of the imidazole to 500 g. of PEG 6000 heated to 70° C. When all the compound is added, the melt is "flash cooled" by cooling in an ice bath and the solidified product reduced to a fine powder and passed through a 100 mesh sieve. The material not passing through is recycled through the melting process.

EXAMPLE XXII

Each of the following polyarylimidazoles were tested for antiinflammatory activity using the aforedescribed carrageenin rat foot edema test, and were found to have the indicated activity at the specified dose:

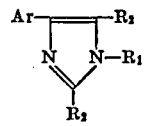

| Ar | Ar' | R₁ | R₂ | Percent inhibition | Dose, mg./kg. |
|---|---|---|---|---|---|
| C₆H₅ | C₆H₅ | H | CF₃ | 30 | 10 |
| 4-CH₃OC₆H₄ | 4-CH₃OC₆H₄ | H | CF₃ | 69 | 10 |
| 2-pyridyl | 2-pyridyl | H | CF₃ | 18 | 33 |
| C₆H₅ | 4-BrC₆H₄ | H | CF₃ | 35 | 33 |
| 4-CH₃OC₆H₄ | C₆H₅ | H | CF₃ | 35 | 33 |
| 2-CH₃C₆H₄ | 2-CH₃C₆H₄ | H | CF₃ | 41 | 33 |
| 4-CH₃SC₆H₄ | 4-CH₃SC₆H₄ | H | CF₃ | 50 | 33 |
| 4-CH₃C₆H₄ | 4-CH₃C₆H₄ | H | CF₃ | 50 | 33 |
| 4-CH₃OC₆H₄ | 4-CH₃OC₆H₄ | CH₃ | CF₃ | 35 | 33 |
| 4-CH₃OC₆H₄ | 4-CH₃OC₆H₄ | C₂H₅ | CF₃ | 45 | 33 |
| 4-CH₃OC₆H₄ | 4-CH₃OC₆H₄ | n-C₃H₇ | CF₃ | 32 | 33 |
| 4-CH₃OC₆H₄ | 4-CH₃OC₆H₄ | CH₂=CHCH₂ | CF₃ | 48 | 33 |
| C₆H₅ | C₆H₅ | H | 4-CH₃OC₆H₄ | 11 | 3 |
| C₆H₅ | C₆H₅ | H | 4-BrC₆H₄ | 28 | 10 |
| C₆H₅ | C₆H₅ | H | 4-ClC₆H₄ | 42 | 10 |
| C₆H₅ | C₆H₅ | H | 4-FC₆H₄ | 45 | 180 |
| C₆H₅ | C₆H₅ | H | 3,4-(CH₃O)₂C₆H₃ | 14 | 33 |
| C₆H₅ | C₆H₅ | H | 4-CH₃C₆H₄ | 25 | 33 |
| C₆H₅ | C₆H₅ | H | 4-pyridyl | 22 | 33 |
| C₆H₅ | C₆H₅ | H | 3-pyridyl | 31 | 33 |
| C₆H₅ | C₆H₅ | H | 2-pyridyl | 6 | 33 |
| C₆H₅ | C₆H₅ | H | 3-BrC₆H₄ | 41 | 33 |
| C₆H₅ | C₆H₅ | H | 4-CH₃SC₆H₄ | 36 | 33 |
| C₆H₅ | C₆H₅ | H | 2-thienyl | 7 | 33 |
| C₆H₅ | C₆H₅ | H | CH₃ | 28 | 33 |
| C₆H₅ | C₆H₅ | H | (CH₃)₂CHCH₂ | 8 | 33 |
| 4-CH₃OC₆H | 4-CH₃OC₆H₄ | H | C₆H₅ | 22 | 10 |
| 4-CH₃OC₆H₄ | 4-CH₃OC₆H₄ | H | 4-CH₃OC₆H₄ | 42 | 33 |
| 4-CH₃OC₆H₄ | 4-CH₃OC₆H₄ | H | 4-ClC₆H₄ | 17 | 33 |
| 4-CH₃OC₆H₄ | 4-CH₃OC₆H₄ | H | 4-BrC₆H₄ | 36 | 10 |
| 4-CH₃OC₆H₄ | 4-CH₃OC₆H₄ | H | 3-BrC₆H₄ | 16 | 33 |
| 4-CH₃OC₆H₄ | 4-CH₃OC₆H₄ | H | 3,4-(CH₃O)₂C₆H₃ | 19 | 33 |
| 4-CH₃OC₆H₄ | 4-CH₃OC₆H₄ | H | 4-CH₃C₆H₄ | 21 | 33 |
| 4-CH₃OC₆H₄ | 4-CH₃OC₆H₄ | H | 2-thienyl | 38 | 33 |
| 4-CH₃OC₆H₄ | 4-CH₃OC₆H₄ | H | 2-furyl | 37 | 33 |
| 4-CH₃OC₆H₄ | 4-CH₃OC₆H₄ | H | 3-pyridyl | 43 | 33 |
| 4-CH₃OC₆H₄ | 4-CH₃OC₆H₄ | H | 2,4-Cl₂C₆H₃ | 22 | 33 |
| 4-CH₃OC₆H₄ | 4-CH₃OC₆H₄ | H | 4-CH₃SC₆H₄ | 38 | 33 |
| 4-CH₃OC₆H₄ | 4-CH₃OC₆H₄ | H | CH₃ | 19 | 33 |
| 4-CH₃OC₆H₄ | 4-CH₃OC₆H₄ | H | (CH₃)₂CHCH₂ | 41 | 33 |
| C₆H₅ | C₆H₅ | CH₃ | 4-BrC₆H₄ | 39 | 10 |
| C₆H₅ | C₆H₅ | C₂H₅ | 4-BrC₆H₄ | 17 | 33 |
| C₆H₅ | C₆H₅ | n-C₃H₇ | 4-BrC₆H₄ | 13 | 33 |
| C₆H₅ | C₆H₅ | n-C₄H₉ | 4-BrC₆H₄ | 29 | 33 |
| C₆H₅ | C₆H₅ | CH₃ | 2,4-Cl₂C₆H₃ | 12 | 33 |
| C₆H₅ | C₆H₅ | CH₃ | CH₃ | 7 | 33 |
| 4-CH₃OC₆H₄ | 4-CH₃OC₆H₄ | CH₃ | C₆H₅ | 27 | 3.0 |
| 4-CH₃OC₆H₄ | 4-CH₃OC₆H₄ | CH₃ | 2,4-Cl₂C₆H₃ | 13 | 33 |
| 2-pyridyl | 2-pyridyl | H | C₆H₅ | 13 | 33 | and

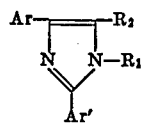

| Ar | Ar' | R₁ | R₂ | Percent inhibition | Dose, mg./kg |
|---|---|---|---|---|---|
| 2-pyridyl | 4-BrC₆H₄ | H | 2-pyridyl | 17 | 33 |
| 2-pyridyl | 4-CH₃OC₆H₄ | H | 2-pyridyl | 38 | 33 |
| 2-pyridyl | 2,4-Cl₂C₆H₃ | H | 2-pyridyl | 18 | 33 |
| 2-pyridyl | 2-pyridyl | H | 2-pyridyl | 45 | 33 |
| 2-pyridyl | 4-CH₃SC₆H₄ | H | 2-pyridyl | 20 | 33 |
| C₆H₅ | C₆H₅ | H | 4-BrC₆H₄ | 36 | 33 |
| C₆H₅ | 4-BrC₆H₄ | H | 4-BrC₆H₄ | 12 | 33 |
| C₆H₅ | 4-CH₃OC₆H₄ | H | 4-BrC₆H₄ | 50 | 33 |
| C₆H₅ | 3-pyridyl | H | 4-BrC₆H₄ | 10 | 33 |
| C₆H₅ | 4-ClC₆H₄ | H | 4-BrC₆H₄ | 2 | 33 |
| 3-CH₃OC₆H₄ | C₆H₅ | H | 3-CH₃OC₆H₄ | 20 | 33 |
| 3-CH₃OC₆H₄ | 4-ClC₆H₄ | H | 3-CH₃OC₆H₄ | 26 | 33 |
| C₆H₅ | C₆H₅ | H | 4-CH₃OC₆H₄ | 46 | 33 |
| C₆H₅ | 4-BrC₆H₄ | H | 4-CH₃OC₆H₄ | 58 | 33 |
| C₆H₅ | 4-CH₃OC₆H₄ | H | 4-CH₃OC₆H₄ | 33 | 33 |
| C₆H₅ | 3-pyridyl | H | 4-CH₃OC₆H₄ | 31 | 33 |
| C₆H₅ | CH₃SC₆H₄ | H | 4-CH₃OC₆H₄ | 25 | 33 |
| 4-BrC₆H₄ | C₆H₅ | H | 4-BrC₆H₄ | 51 | 33 |
| 4-BrC₆H₄ | 4-BrC₆H₄ | H | 4-BrC₆H₄ | 18 | 33 |
| 4-BrC₆H₄ | 4-ClC₆H₄ | H | 4-BrC₆H₄ | 41 | 33 |
| 4-BrC₆H₄ | 3-pyridyl | H | 4-BrC₆H₄ | 36 | 33 |
| 2-CH₃OC₆H₄ | C₆H₅ | H | 2-CH₃OC₆H₄ | 34 | 33 |
| 2-CH₃OC₆H₄ | 4-BrC₆H₄ | H | 2-CH₃OC₆H₄ | 48 | 33 |
| 2-CH₃OC₆H₄ | 4-CH₃OC₆H₄ | H | 2-CH₃C₆H₄ | 34 | 33 |
| 2-CH₃C₆H₄ | 4-BrC₆H₄ | H | 2-CH₃C₆H₄ | 21 | 33 |

TABLE—Continued

| Ar | Ar | R₁ | R₂ | Activity Percent inhibition | Dose, mg./kg. |
|---|---|---|---|---|---|
| 4-CH₃SC₆H₄ | 4-CH₃OC₆H₄ | H | 4-CH₃SC₆H₄ | 26 | 33 |
| 4-CH₃SC₆H₄ | 4-BrC₆H₄ | H | 4-CH₃SC₆H₄ | 9 | 33 |
| 4-CH₃SC₆H₄ | C₆H₅ | H | 4-CH₃SC₆H₄ | 42 | 33 |
| 4-CH₃SC₆H₄ | 4-CH₃SC₆H₄ | H | 4-CH₃SC₆H₄ | 19 | 33 |
| 4-C₂H₅OC₆H₄ | C₆H₅ | H | 4-C₂H₅OC₆H₄ | 36 | 33 |
| 4-FC₆H₄ | 4-BrC₆H₄ | H | 4-FC₆H₄ | 57 | 10 |
| 4-FC₆H₄ | 4-CH₃OC₆H₄ | H | 4-FC₆H₄ | 20 | 33 |
| 4-FC₆H₄ | 3-pyridyl | H | 4-FC₆H₄ | 13 | 33 |
| 4-CH₃C₆H₄ | C₆H₅ | H | 4-CH₃C₆H₄ | 40 | 33 |
| C₆H₅ | 4-CH₃OC₆H₄ | H | CF₃ | 25 | 33 |
| C₆H₅ | 4-ClC₆H₄ | H | CF₃ | 43 | 33 |
| 4-CH₃C₆H₄ | 4-BrC₆H₄ | H | 4-CH₃C₆H₄ | 40 | 33 |
| 4-n-C₄H₉OC₆H₄ | 4-BrC₆H₄ | H | 4-n-C₄H₉OC₆H₄ | 13 | 33 |
| 2-furyl | C₆H₅ | H | 2-furyl | 6 | 33 |
| 2-furyl | 4-CH₃OC₆H₄ | H | 2-furyl | 6 | 33 |
| C₆H₅ | CH₃ | H | C₆H₅ | 16 | 33 |
| Phenylbutazone | | | | 55 | 33 |

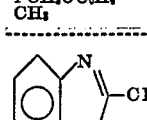

*—40 | 100

* Indicates an increase in edema.

EXAMPLE XXIII 4-phenyl-2,5-trifluoromethylimidazole

To 1.0 g. (4.5 m. moles) of 1-phenyl-3,3,3-trifluoro-1,2-propanedione in 25 ml. of dry glacial acetic acid is added 2.0 g. ammonium acetate followed by the dropwise addition of 778 mg. (5.4 m. moles) of trifluoroacetaldehyde ethyl hemiacetal in 10 ml. of the same solvent. The reaction mixture is heated to reflux for 1.5 hours and an additional 778 mg. of the hemiacetal added and refluxing continued for 2 hours. The clear solution is poured into 200 ml. of water, the pH adjusted to 7.0 with ammonium hydroxide and extracted with 2×200 ml. of ethyl acetate. The organic layer is separated, dried over sodium sulfate and concentrated under reduced pressure to dryness. The residue is triturated with hexane and the resulting solids filtered, 598 mg., M.P. 158–164° C.

*Analysis.*—Calcd. for $C_{11}H_6F_6N_2$ (percent): C, 47.2; H, 2.2; N, 10.0. Found (percent) C, 47.5; H, 2.5; N, 99.

EXAMPLE XXIV

Starting with an appropriate substituted 1-aryl-3,3,3-trifluoro-1,2-propanedione and trifluoroacetaldehyde ethyl hemiacetal, and following the procedure of Example XXIII, the following 2,5-trifluoromethylimidazoles are prepared:

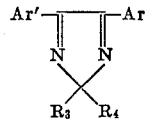

| Ar | Ar |
|---|---|
| 2-FC₆H₄ | 3-n-C₄H₉SC₆H₄ |
| 4-FC₆H₄ | 3-C₂H₅OC₆H₄ |
| 4-ClC₆H₄ | 2-furyl |
| 3-BrC₆H₄ | 4-pyridyl |
| 4-i-C₃H₇C₆H₄ | 2-thienyl |
| 4-CH₃OC₆H₄ | 4-CH₃SC₆H₄ |
| | 2-BrC₆H₄ |

EXAMPLE XXV 2,3-bis(p-methoxyphenyl)-1,4-diazaspiro[4,5]deca-1,3-diene

To 75 ml. of glacial acetic acid is added 5.4 g. (0.02 mole) of 4,4'-methoxybenzil, 1.9 g. (0.02 mole) cyclohexanone and 20 g. of ammonium acetate and the resulting mixture heated to reflux for 3.5 hours. The reaction is poured into water, the pH adjusted to 7 with ammonium hydroxide and the aqueous solution decanted from the separated oil. The oil is dissolved in 75 ml. of isopropanol and allowed to crystallize. The solids are filtered and the filtrate concentrated to an oil which is crystallized from isopropanol-water, 1.6 g., M.P. 85–88° C.

*Analysis.*—Calcd. for $C_{22}H_{24}N_2O_2$ (percent) C, 75.9; H, 6.9; N, 8.1. Found (percent): C, 75.6; H, 7.1; N, 8.0.

In a similar manner the following compounds are prepared:

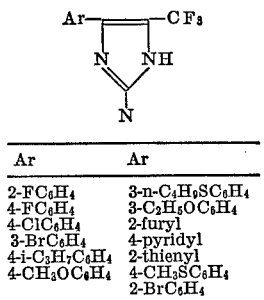

| Ar | Ar' | R₃ | R₄ | M.P., ° C. |
|---|---|---|---|---|
| φ | φ | CH₃ | CH₃ | 76–79 |
| φ | φ | —(CH₂)₅— | | 103–106 |
| 4-CH₃OC₆H₄ | 4-CH₃OC₆H₄ | CH₃ | CH₃ | 88–91 |

EXAMPLE XXVI

Starting with the appropriate benzil and ketone, and repeating the procedure of Example XXV, the following analogs are synthesized:

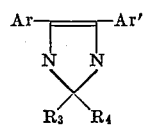

| Ar | Ar' | R₃ | R₄ |
|---|---|---|---|
| 4-ClC₆H₄ | 2-ClC₆H₄ | CH₃ | C₂H₅ |
| 3-FC₆H₄ | 4-FC₆H₄ | CH₃ | n-C₃H₇ |
| C₆H₅ | 2-BrC₆H₄ | CH₃ | CH₃ |
| 4-FC₆H₄ | 4-CH₃C₆H₄ | —(CH₂)₆— | |
| 4-CH₃OC₆H₄ | 4-CH₃OC₆H₄ | CF₃ | CH₃ |
| 4-CH₃C₆H₄ | 2-FC₆H₄ | —(CH₂)₂O(CH₂)₂— | |
| 4-CH₃C₆H₄ | 2-FC₆H₄ | —(CH₂)₂S(CH₂)₂— | |
| 2-FC₆H₄ | 4-CH₃OC₆H₄ | —(CH₂)₇— | |
| 2-FC₆H₄ | 4-CH₃OC₆H₄ | —(CH₂)₂NH(CH₂)₂— | |
| 3-ClC₆H₄ | 3-ClC₆H₄ | —(CH₂)₂NH(CH₂)₂— | |
| 3-ClC₆H₄ | 3-ClC₆H₄ | —(CH₂)₂NCH₃(CH₂)₂— | |
| 4-ClC₆H₄ | 4-C₂H₅OC₆H₄ | CH₃ | n-C₄H₉ |
| 4-ClC₆H₄ | 4-C₂H₅OC₆H₄ | n-C₃H₇ | n-C₃H₇ |
| 4-ClC₆H₄ | 4-C₂H₅OC₆H₄ | —(CH₂)₇— | |

EXAMPLE XXVII

In vivo activity on acute experimental synovitis in dogs

Following the procedure of McCarty et al.; J. Exp. Med., 124, 99 (1966) with slight modification, Chang et al., Arthristis Rheum., 11, 145 (1968), five anesthetized dogs are injected with sodium urate crystals (10 mg., suspended in 1 ml. of normal saline) in the knee joint and the pressure resulting in the joint from the ensuring inflammation measured and recorded by a Heath Servorecorder. This reading is referred to as Control Knee Pressure.

After a recovery period of two days the experiment is repeated, using the opposite knee, and the dogs receive, interavenously, 10 mg./kg. of 2-trifluoromethyl-4,5-bis(p-methoxyphenyl)imidazole in 95% polyethylene glycol 300 and 5% Tween 80 fifteen minutes prior to the injection of the urate crystals. The pressure is again measured, recorded and designated Test Knee Pressure.

| Dog Number | 1 | 2 | 3 | 4 | 5 |
|---|---|---|---|---|---|
| Control Knee Pressure [1] | 22 | 26 | 22 | 23 | 32 |
| Test Knee Pressure | 1 | 3 | 11 | 5 | 2 |

[1] Pressure is reported in mm. Hg.

Decrease in the joint pressure due to a reduction of inflammation is taken as an indication of activity.

EXAMPLE XXVIII

In vitro inhibition of platelet aggregation

The ability of the compounds of the present invention to inhibit platelet aggregation in vitro is measured according to the method of Born et al., J. Physiol., 168, 178 (1963) and modified by Constantine, Nature, 205, 1075 (1965) and comprises the following procedure:

Anesthetized male rabbits are bled from a carotid artery into plastic centrifuge tubes containing 0.1 volume 3% sodium citrate. Platelet-rich plasma is separated by centrifugation at 100 G for 10 minutes at 20° C. Plasma from 3 animals is pooled; 5 ml. samples are placed into clear plastic cuvettes and stirred at 1000 r.p.m., followed by the addition of compounds of the present invention at levels of $6 \times 10^{-4}$, $10^{-5}$ and $10^{-6}$ moles/liter. After 10 minutes of incubation with the platelet-rich plasma at room temperature, collagen, a protein known to cause platelet aggregation, is added (0.27 ml. collagen/4 mi. plasma) and changes in the optical density are followed with a Spectronic 20 colorimeter attached to a Houston Instrument TY Recorder. Platelet aggregation is indicated by a decrease in optical density. The relative potency of compounds are thus rated on their ability to inhibit (percent) collagen induced platelet aggregation.

When 2 - trifluoromethyl - 4,5-bis(p - methoxyphenyl) imidazole is tested according to the above procedure the following results are obtained for rabbit, dog and human plasma:

| Species | No. of samples tested | Final concentration (molar) | Mean percent inhibition |
|---|---|---|---|
| Rabbit | 3 | $1 \times 10^{-6}$ | 40 |
| Dog | 5 | $1 \times 10^{-6}$ | 65 |
| | 3 | $1 \times 10^{-7}$ | 60 |
| Human | 6 | $1 \times 10^{-6}$ | 70 |
| | 5 | $1 \times 10^{-7}$ | 48 |

EXAMPLE XXIX

In vivo inhibition of platelet aggregation

The capacity of the compounds of the present invention to inhibit platelet aggregation in a modified in vivo test reported by Constantine, Nature, 214, 1084 (1967) and is measured by the following procedure:

Unanesthetized fasted adult mongrel dogs of either sex are dosed orally (P.O.) at 25 mg./kg. with a solid dispersion of 2-trifluoromethyl - 4,5 - bis(p - methoxyphenyl) imidazole in polyethylene glycol. Blood samples are taken at hourly intervals and placed in plastic centrifuge tubes containing 0.1 volume 3% sodium citrate. Platelet-rich plasma is separated by centrifugation at 100 G for 10 minutes at 80° C. and treated with a collagen suspension in saline. Changes in optical density are then followed with a Spectronic 20 colorimeter attached to a Houston Instrument TY Recorder. Platelet aggregation is indicated by a decrease in optical density, and the inhibition of collagen induced aggregation is reported a positive or negative. Measurements are carried out on the hourly samples, allowing for the determination of a duration of the initial effect.

| Dog No. | Response (duration) |
|---|---|
| 1 | Positive (30 min.–48 hrs.) |
| 2 | Positive (2 hrs.–72 hrs.) |

PREPARATION A

DIARYLDIKETONES

The following diaryl-α-diketones, not previously reported in the chemical literature, are synthesized via a selenium dioxide oxidation of the corresponding monoketone, essentially the method taught by Hatt et al., J. Chem. Soc., 93 (1936), wherein desoxybenzoin is oxidized to benzil:

$$\text{Ar}-\overset{\overset{\displaystyle O}{\|}}{\text{C}}-\overset{\overset{\displaystyle O}{\|}}{\text{C}}-\text{Ar}'$$

| Ar | Ar' | Ar | Ar' |
|---|---|---|---|
| 4-ClC$_6$H$_4$ | 2-ClC$_6$H$_4$ | 2-FC$_6$H$_4$ | 2-CH$_3$C$_6$H$_4$ |
| 3-FC$_6$H$_4$ | 4-FC$_6$H$_4$ | 2-FC$_6$H$_4$ | 4-C$_2$H$_5$C$_6$H$_4$ |
| 2-BrC$_6$H$_4$ | C$_6$H$_5$ | 2-FC$_6$H$_4$ | 4-CH$_3$OC$_6$H$_4$ |
| 4-FC$_6$H$_4$ | 4-CH$_3$C$_6$H$_4$ | 2-FC$_6$H$_4$ | 4-i-C$_3$H$_7$C$_6$H$_4$ |
| 4-FC$_6$H$_4$ | 4-t-C$_4$H$_9$C$_6$H$_4$ | 4-ClC$_6$H$_4$ | 2-CH$_3$C$_6$H$_4$ |
| 4-FC$_6$H$_4$ | 3-C$_2$H$_5$C$_6$H$_4$ | 4-ClC$_6$H$_4$ | 4-CH$_3$SC$_6$H$_4$ |
| 4-C$_2$H$_5$C$_6$H$_4$ | C$_6$H$_5$ | 4-ClC$_6$H$_4$ | 4-CH$_3$C$_6$H$_4$ |
| 4-CH$_3$C$_6$H$_4$ | 2-FC$_6$H$_4$ | 4-ClC$_6$H$_4$ | 4-n-C$_4$H$_9$C$_6$H$_4$ |
| 4-CH$_3$C$_6$H$_4$ | 3-C$_2$H$_5$OC$_6$H$_4$ | 4-ClC$_6$H$_4$ | 4-C$_2$H$_5$OC$_6$H$_4$ |
| 4-CH$_3$C$_6$H$_4$ | 4-CH$_3$SC$_6$H$_4$ | 3-ClC$_6$H$_4$ | 3-ClC$_6$H$_4$ |
| 2-CH$_3$C$_6$H$_4$ | 4-CH$_3$C$_6$H$_4$ | 3-ClC$_6$H$_4$ | 4-C$_2$H$_5$C$_6$H$_4$ |
| 4-C$_2$H$_5$SC$_6$H$_4$ | 4-CH$_3$SC$_6$H$_4$ | 3-ClC$_6$H$_4$ | 4-n-C$_4$H$_9$C$_6$H$_4$ |
| 2-FC$_6$H$_4$ | 2-ClC$_6$H$_4$ | 3-ClC$_6$H$_4$ | 4-t-C$_4$H$_9$C$_6$H$_4$ |
| 4-BrC$_6$H$_4$ | 4-CH$_3$C$_6$H$_4$ | 3-ClC$_6$H$_4$ | 4-C$_2$H$_5$SC$_6$H$_4$ |
| 4-BrC$_6$H$_4$ | 2-CH$_3$C$_6$H$_4$ | 3-CH$_3$C$_6$H$_4$ | 4-CH$_3$C$_6$H$_4$ |
| 2-BrC$_6$H$_4$ | 4-BrC$_6$H$_4$ | 4-n-C$_3$H$_7$C$_6$H$_4$ | 4-s-C$_4$H$_9$OC$_6$H$_4$ |
| 2-CH$_3$OC$_6$H$_4$ | 3-CH$_3$OC$_6$H$_4$ | 4-ClC$_6$H$_4$ | 3,4-(CH$_3$O)$_2$C$_6$H$_3$ |
| 2-CH$_3$OC$_6$H$_4$ | 2-CH$_3$SC$_6$H$_4$ | 4-CH$_3$OC$_6$H$_4$ | 3,4-(CH$_3$O)$_2$C$_6$H$_3$ |
| 2-CH$_3$OC$_6$H$_4$ | 4-n-C$_4$H$_9$SC$_6$H$_4$ | 4-C$_2$H$_5$SC$_6$H$_4$ | 3,4-(CH$_3$O)$_2$C$_6$H$_3$ |
| 2-CH$_3$C$_6$H$_4$ | 4-CH$_3$OC$_6$H$_4$ | 4-BrC$_6$H$_4$ | 3,4-(CH$_3$O)$_2$C$_6$H$_3$ |
| 2-CH$_3$C$_6$H$_4$ | 3-C$_2$H$_5$OC$_6$H$_5$ | 2-furyl | 2-thienyl |
| 3-thienyl | C$_6$H$_5$ | 2-furyl | 2-pyridyl |
| 2-pyridyl | 4-pyridyl | 2-furyl | 3-pyridyl |
| 2-pyridyl | 3,4-(CH$_3$O)$_2$C$_6$H$_3$ | 2-furyl | 4-pyridyl |
| | | 2-furyl | 3,4-(CH$_3$O)$_2$C$_6$H$_3$ |
| | | 2-furyl | 4-BrC$_6$H$_4$ |

PREPARATION B

ALKYLARYLDIKETONES (a) 1 - phenyl - 3,3,3-trifluoro-1,2-propanedione monohydrate.—Trifluoromethyl benzyl ketone (13.7 g., 0.072 mole), prepared according to the method of Nes et al., J. Am. Chem. Soc., 72, 5409 (1950), is added to a suspension of 8.8 g. (0.079 mole) of selenium dioxide in 300 ml. of glacial acetic acid and the reaction mixture heated to 80° C. for 3 hours. The mixture is then cooled, the selenium filtered and the filtrate poured into 1500 ml. of water. The hazy solution is extracted with ether and the ether extracts washed free of acetic acid by repeated washings with 10% aqueous sodium bicarbonate. The extracts are dried over calcium sulfate, concentrated to a semi-solid and the residue recrystallized from petroleum ether, 4.1 g., M.P. 83–85° C. Additional amounts of the product are obtainable by concentration of the recrystalization mother liquors.

Analysis.—Calcd. for C$_9$H$_7$F$_3$O$_3$ (percent): C, 49.2; H, 3.2. Found (percent): C, 48.6; H, 3.2.

Following the procedure of Nes et al., and the oxidation described above, the following alkylaryldiketones, not previously reported in the literature, are synthesized:

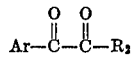

| Ar | R$_2$ | Ar | R$_2$ |
|---|---|---|---|
| C$_6$H$_5$ | t-C$_4$H$_9$ | 4-C$_2$H$_5$C$_6$H$_4$ | C$_2$H$_5$ |
| 2-FC$_6$H$_4$ | CH$_3$ | 4-n-C$_3$H$_7$C$_6$H$_4$ | CH$_3$ |
| 2-FC$_6$H$_4$ | i-C$_3$H$_7$ | 4-CH$_3$SC$_6$H$_4$ | CH$_3$ |
| 2-FC$_6$H$_4$ | n-C$_4$H$_9$ | 3,4-(CH$_3$O)$_2$C$_6$H$_3$ | n-C$_4$H$_9$ |
| 2-FC$_6$H$_4$ | t-C$_4$H$_9$ | 3-furyl | CH$_3$ |
| 4-FC$_6$H$_4$ | C$_2$H$_5$ | 3-furyl | C$_2$H$_5$ |
| 4-FC$_6$H$_4$ | n-C$_3$H$_7$ | 2-pyridyl | C$_2$H$_5$ |
| 4-ClC$_6$H$_4$ | n-C$_4$H$_9$ | 2-pyridyl | CH$_3$ |
| 4-ClC$_6$H$_4$ | s-C$_4$H$_9$ | 4-pyridyl | n-C$_3$H$_7$ |
| 4-BrC$_6$H$_4$ | CH$_3$ | | |
| 4-BrC$_6$H$_4$ | C$_2$H$_5$ | | |
| 4-BrC$_6$H$_4$ | n-C$_3$H$_7$ | | |

PREPARATION C

Aryl-arylmethyl ketones

The mono ketones employed in Preparation A can be conveniently synthesized by the method of Curtin et al., J. Am. Chem. Soc., 76, 3719 (1954), as exemplified for the synthesis of p-anisyl p-methylphenyl ketone, which comprises the Friedel-Crafts reaction of p-tolylacetyl chloride and anisole in the presence of aluminum chloride in carbon disulfide solvent.

Starting with the appropriate arylacetyl chlorides, which are either commercially available or reported in the literature, and the known aryl substrate, and employing the procedure of Curtin et al., the following aryl-arylmethyl ketones, not previously reported in the chemical literature, are prepared:

$$\text{ArCH}_2\overset{\text{O}}{\underset{\|}{\text{C}}}\text{Ar}'$$

| Ar | Ar' | Ar | Ar' |
|---|---|---|---|
| 3-$FC_6H_4$ | 4-$FC_6H_4$ | 4-$FC_6H_4$ | 4-$CH_3C_6H_4$ |
| 2-$FC_6H_4$ | 4-$ClC_6H_4$ | 2-$FC_6H_4$ | 4-$CH_3C_6H_4$ |
| 2-$FC_6H_4$ | 4-$FC_6H_4$ | 2-$FC_6H_4$ | 3-$BrC_6H_4$ |
| 2-$BrC_6H_4$ | 4-$BrC_6H_4$ | 2-$CH_3C_6H_4$ | 4-$FC_6H_4$ |
| 2-$FC_6H_4$ | 2-$ClC_6H_4$ | 4-$ClC_6H_4$ | 4-$CH_3SC_6H_4$ |
| 2-$CH_3C_6H_4$ | 4-$ClC_6H_4$ | 3-$C_2H_5C_6H_4$ | 4-$FC_6H_4$ |
| 2-$CH_3C_6H_4$ | 4-$BrC_6H_4$ | 4-$FC_6H_4$ | 4-$C_2H_5C_6H_4$ |
| 4-$CH_3C_6H_4$ | 4-$BrC_6H_4$ | 4-$ClC_6H_4$ | 4-$C_2H_5OC_6H_4$ |
| 2-$CH_3OC_6H_4$ | 4-$FC_6H_4$ | 3-$ClC_6H_4$ | 4-$C_2H_5SC_6H_4$ |
| 3-$ClC_6H_4$ | 4-$C_2H_5C_6H_4$ | 2-$CH_3OC_6H_4$ | 2-$CH_3SC_6H_4$ |
| 4-$CH_3C_6H_4$ | 4-$CH_3SC_6H_4$ | 3-$C_2H_5OC_6H_4$ | 2-$CH_3C_6H_4$ |
| 2-$CH_3OC_6H_4$ | 3-$CH_3OC_6H_4$ | 3-$C_2H_5OC_6H_4$ | 4-$CH_3C_6H_4$ |
| 2-$CH_3C_6H_4$ | 4-$CH_3OC_6H_4$ | 4-$CH_3SC_6H_4$ | 4-$C_2H_5SC_6H_4$ |
| 4-$ClC_6H_4$ | 3,4-$(CH_3O)_2C_6H_3$ | 4-$FC_6H_4$ | 4-$i$-$C_3H_7C_6H_4$ |
| 4-$BrC_6H_4$ | 3,4-$(CH_3O)_2C_6H_3$ | 4-$FC_6H_4$ | 4-$t$-$C_4H_9C_6H_4$ |
| 4-$CH_3C_6H_4$ | 3,4-$(CH_3O)_2C_6H_3$ | 3-$ClC_6H_4$ | 4-$t$-$C_4H_9C_6H_4$ |
| 3-$ClC_6H_4$ | 4-$n$-$C_4H_9C_6H_4$ | 2-$CH_3OC_6H_4$ | 4-$n$-$C_4H_9SC_6H_4$ |
| 4-$C_2H_5SC_6H_4$ | 3,4-$(CH_3O)_2C_6H_3$ | 3,4-$(CH_3O)_2C_6H_3$ | 2-furyl |
| 2-thienyl | 2-furyl | 3-thienyl | $C_6H_5$ |
| 4-$BrC_6H_4$ | 2-furyl | 2-pyridyl | 3,4-$(CH_3O)_2C_6H_3$ |
| 2-pyridyl | 2-furyl | | |
| 3-pyridyl | 2-furyl | | |
| 4-pyridyl | 2-furyl | | |

The ketone, 4-picolyl 2-pyridyl ketone, is prepared from 4-picoline and methyl 2-picolinate following the method employed by Osuch et al., J. Org. Chem., 22, 939 (1957) for the synthesis of 4-picolyl phenyl ketone.

What is claimed is:

1. A method of treating inflammation in mammals which comprises administering to said mammal an effective amount of a compound selected from those of the formulae:

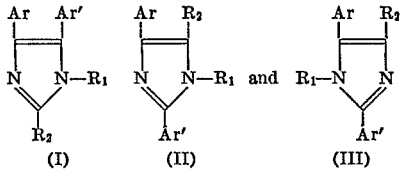

(I)   (II)   (III)

and the pharmaceutically acceptable acid addition salt thereof, wherein:

Ar and Ar' are each selected from the group consisting of furyl, thienyl, pyridyl, phenyl and substituted phenyl wherein said substituents are selected from the group consisting of fluorine, chlorine, bromine, alkyl, alkoxy and alkylthio each containing from 1 to 4 carbon atoms and 3,4-dimethoxy;

$R_1$ is selected from the group consisting of hydrogen, alkyl containing from 1 to 4 carbon atoms and alkenyl containing from 3 to 4 carbon atoms; and $R_2$ is selected from the group consisting of trifluoromethyl, alkyl containing from 1 to 4 carbon atoms, furyl, thienyl, pyridyl, phenyl and substituted phenyl wherein said substituents are selected from the group consisting of fluorine, chlorine, bromine, trifluoromethyl, alkyl, alkoxy and alkylthio each containing from 1 to 4 carbon atoms, 3,4-dimethoxy and 2,4-dichloro.

2. The method of claim 1, Formula I, wherein Ar and Ar' are each substitued phenyl and $R_2$ is hydrogen.

3. The method of claim 1, Formula I, wherein Ar is phenyl, Ar' is substituted phenyl and $R_1$ is hydrogen.

4. The method of claim 1, Formula I, wherein Ar and Ar' are each substituted phenyl and $R_1$ is methyl.

5. The method of claim 1, Formula I, wherein Ar and Ar' are each phenyl and $R_1$ is hydrogen.

6. The method of claim 2, wherein $R_2$ is trifluoromethyl and Ar and Ar' are each p-methoxyphenyl.

7. The method of claim 2 wherein $R_2$ is trifluoromethyl and Ar and Ar' are each p-methylthiophenyl.

8. The method of claim 2 wherein $R_2$ is trifluoromethyl and Ar and Ar' are each o-methoxyphenyl.

9. The method of claim 2 wherein $R_2$ is trifluoromethyl and Ar and Ar' are each m-methoxyphenyl.

10. The method of claim 2 wherein $R_2$ is tribuoromethyl and Ar and Ar' are each p-fluorophenyl.

11. The method of claim 2 wherein $R_2$ is trifluoromethyl and Ar and Ar' are each p-n-butoxyphenyl.

12. The method of claim 2 wherein $R_2$ is trifluoromethyl and Ar and Ar' are each 3,4-dimethoxyphenyl.

13. The method of claim 2 wherein $R_2$ is trifluoromethyl and Ar and Ar' are each p-ethoxyphenyl.

14. The method of claim 2 wherein $R_2$ is trifluoromethyl and Ar and Ar' are each p-bromophenyl.

15. The method of claim 2 wherein $R_2$ is trifluoromethyl and Ar and Ar' are each p-tolyl.

16. The method of claim 2 wherein $R_2$ is phenyl and Ar and Ar' are each p-methoxyphenyl.

17. The method of claim 2 wherein $R_2$ is isobutyl and Ar and Ar' are each p-methoxyphenyl.

18. The method of claim 3 wherein $R_2$ is trifluoromethyl and Ar' is p-bromophenyl.

19. The method of claim 3 wherein $R_2$ is trifluoromethyl and Ar' is p-methoxyphenyl.

20. The method of claim 4 wherein $R_2$ is trifluoromethyl and Ar and Ar' are each p-methoxyphenyl.

21. The method of claim 5 wherein $R_2$ is p-bromophenyl.

References Cited

Biltz, Chem. Abst., vol. 1, pp. 2605–6 (1907).
Carrara et al., Chem. Abst., vol. 40, col. 7241 (1946).
Raasch, Chem. Abst., vol. 57, col. 4520–1 (1962).
Yak, J. Med. Pharm. Chem., vol. 1, pp. 121–33 (1959).

STANLEY J. FRIEDMAN, Primary Examiner

F. E. WADDELL, Assistant Examiner

U.S. Cl. X.R.

424—263